US010525557B2

(12) United States Patent
Subhedar et al.

(10) Patent No.: US 10,525,557 B2
(45) Date of Patent: Jan. 7, 2020

(54) AUTOMATED MATTRESS MANUFACTURING PROCESS AND APPARATUS

(71) Applicant: DREAMWELL, LTD., Las Vegas, NV (US)

(72) Inventors: Vinit V. Subhedar, Norcross, GA (US); Gregory Fowler, Alpharetta, GA (US); Francis G. Jan, Atlanta, GA (US)

(73) Assignee: DREAMWELL, LTD., Las Vegas, NV (US)

( * ) Notice: Subject to any disclaimer, the term of this patent is extended or adjusted under 35 U.S.C. 154(b) by 700 days.

(21) Appl. No.: 15/004,334

(22) Filed: Jan. 22, 2016

(65) Prior Publication Data

US 2016/0214219 A1   Jul. 28, 2016

Related U.S. Application Data

(60) Provisional application No. 62/106,938, filed on Jan. 23, 2015, provisional application No. 62/106,951, filed on Jan. 23, 2015, provisional application No. 62/147,887, filed on Apr. 15, 2015.

(51) Int. Cl.
| | |
|---|---|
| *B23P 21/00* | (2006.01) |
| *B68G 7/00* | (2006.01) |
| *A47C 27/05* | (2006.01) |
| *A47C 27/15* | (2006.01) |
| *A47C 27/06* | (2006.01) |
| *B68G 15/00* | (2006.01) |

(52) U.S. Cl.
CPC ............ *B23P 21/004* (2013.01); *A47C 27/05* (2013.01); *A47C 27/064* (2013.01); *A47C 27/15* (2013.01); *B68G 7/00* (2013.01); *B68G 15/005* (2013.01)

(58) Field of Classification Search
CPC ....... B23P 21/004; B68G 15/005; B68G 7/00; A47C 27/05; A47C 27/064; A47C 27/15
See application file for complete search history.

(56) References Cited

U.S. PATENT DOCUMENTS

| | | | |
|---|---|---|---|
| 685,160 | A | 10/1901 | Marshall |
| 1,706,267 | A | 3/1929 | Van De Mark et al. |
| 1,733,660 | A | 10/1929 | Gail |

(Continued)

FOREIGN PATENT DOCUMENTS

| | | |
|---|---|---|
| CH | 683840 A5 | 5/1994 |
| CN | 102281798 A | 12/2011 |

(Continued)

OTHER PUBLICATIONS

Notification Concerning Transmittal of International Preliminary Report on Patentability (Chaper I of the Patent Cooperation Treaty), issued in International Application No. PCT/US2016/014473, dated Aug. 3, 2017; 8 pages.

(Continued)

*Primary Examiner* — Jacob J Cigna
*Assistant Examiner* — Lee A Holly
(74) *Attorney, Agent, or Firm* — Cantor Colburn LLP

(57) ABSTRACT

An automated system and process for manufacturing a mattress generally includes an automated foam layer placement apparatus for accurately securing one or more foam layers onto an innercore unit and bucket assembly.

9 Claims, 34 Drawing Sheets

(56) References Cited

U.S. PATENT DOCUMENTS

| | | |
|---|---|---|
| 2,604,210 A | 7/1952 | Boone |
| 3,180,293 A * | 4/1965 | Cash ................ B68G 7/08 |
| | | 112/118 |
| 3,279,631 A | 10/1966 | McCartney |
| 3,689,106 A | 9/1972 | Young |
| 3,720,329 A | 3/1973 | Gamble |
| 3,885,691 A | 5/1975 | Knapp |
| 3,934,740 A | 1/1976 | Rumell |
| 4,000,870 A | 1/1977 | Davies |
| 4,020,959 A | 5/1977 | Livesay |
| 4,049,286 A | 9/1977 | Francis, Jr. |
| 4,074,505 A | 2/1978 | Keren et al. |
| 4,234,983 A | 11/1980 | Stumpf |
| 4,234,984 A | 11/1980 | Stumpf |
| 4,274,168 A | 6/1981 | Depowski |
| 4,355,940 A | 10/1982 | Derickson |
| 4,439,977 A | 4/1984 | Stumpf |
| 4,451,946 A | 6/1984 | Stumpf |
| 4,459,669 A | 7/1984 | Dye |
| 4,523,344 A | 6/1985 | Stumpf |
| 4,541,768 A | 9/1985 | Walker et al. |
| 4,565,046 A | 1/1986 | Stumpf |
| 4,578,834 A | 4/1986 | Stumpf |
| 4,724,590 A | 2/1988 | Langas et al. |
| 4,787,808 A | 11/1988 | Shimoji et al. |
| 4,806,061 A | 2/1989 | Fenton |
| 4,815,182 A | 3/1989 | Langas et al. |
| 4,832,185 A | 5/1989 | Huber |
| 4,839,933 A | 6/1989 | Plewright et al. |
| D303,030 S | 8/1989 | Goldston |
| 4,873,732 A | 10/1989 | Perez |
| 4,995,162 A | 2/1991 | Betere Cabeza |
| 5,016,305 A | 5/1991 | Suenens |
| 5,161,844 A * | 11/1992 | Zimmer ............... B65H 3/22 |
| | | 271/18.3 |
| 5,326,212 A | 7/1994 | Roberts |
| 5,478,190 A | 12/1995 | Helton |
| 5,495,809 A | 3/1996 | Carbo |
| 5,579,549 A * | 12/1996 | Selman ............... A47C 27/05 |
| | | 427/288 |
| 5,613,287 A | 3/1997 | St. Clair |
| 5,621,935 A | 4/1997 | St. Clair |
| 5,704,624 A | 1/1998 | Davis |
| 5,746,877 A | 5/1998 | Notheis et al. |
| 5,756,022 A * | 5/1998 | Siegel ................ A47C 27/05 |
| | | 264/271.1 |
| 5,934,041 A | 8/1999 | Rudolf et al. |
| 6,079,941 A | 6/2000 | Lee |
| 6,101,697 A | 8/2000 | Stumpf et al. |
| 6,178,723 B1 | 1/2001 | Mossbeck |
| 6,260,331 B1 | 7/2001 | Stumpf |
| 6,273,257 B1 | 8/2001 | Mossbeck |
| 6,386,560 B2 | 5/2002 | Calendar |
| 6,817,578 B1 | 11/2004 | Garcia et al. |
| 6,860,493 B2 | 3/2005 | Orozco |
| 7,007,790 B2 | 3/2006 | Brannon |
| 7,383,676 B1 | 6/2008 | Schmidt |
| 7,465,143 B1 | 12/2008 | Adams |
| 7,731,206 B2 | 6/2010 | Borrmann |
| 7,731,207 B2 | 6/2010 | Santos Gómez |
| 8,042,829 B2 | 10/2011 | Hailston et al. |
| 8,104,807 B2 | 1/2012 | Maffeis |
| 8,596,611 B1 | 12/2013 | Fountain |
| 8,851,488 B2 | 10/2014 | Carruyo |
| 8,979,099 B1 | 3/2015 | Ellis |
| 9,192,266 B2 | 11/2015 | Starr et al. |
| D744,713 S | 12/2015 | Della Polla |
| 9,216,752 B1 | 12/2015 | Carruyo |
| 2003/0149608 A1 | 8/2003 | Kall et al. |
| 2003/0209827 A1 | 11/2003 | Levera et al. |
| 2004/0061267 A1 | 4/2004 | Brown |
| 2004/0224086 A1 | 11/2004 | Wright |
| 2004/0227086 A1 | 11/2004 | Haug et al. |
| 2004/0254825 A1 | 12/2004 | Hsu et al. |
| 2004/0261186 A1 | 12/2004 | Gladney |
| 2005/0161363 A1 | 7/2005 | Kowalski et al. |
| 2005/0256776 A1 | 11/2005 | Bayoumi et al. |
| 2005/0257883 A1 * | 11/2005 | Anagnostopoulos ................ |
| | | A47C 27/063 |
| | | 156/290 |
| 2007/0214625 A1 | 9/2007 | Brown et al. |
| 2008/0012260 A1 | 1/2008 | Ouyang et al. |
| 2008/0149030 A1 | 6/2008 | Klein |
| 2010/0071136 A1 | 3/2010 | Weber |
| 2010/0072676 A1 * | 3/2010 | Gladney ............ A47C 27/148 |
| | | 264/510 |
| 2010/0281666 A1 | 11/2010 | Tseng |
| 2011/0253770 A1 | 10/2011 | Resta et al. |
| 2011/0282476 A1 | 11/2011 | Hegemier et al. |
| 2012/0091688 A1 | 4/2012 | Fink |
| 2015/0183567 A1 | 7/2015 | Tevault et al. |
| 2015/0203221 A1 | 7/2015 | Van De Dey et al. |

FOREIGN PATENT DOCUMENTS

| | | |
|---|---|---|
| DE | 2856600 A1 | 7/1980 |
| DE | 3540233 A1 | 11/1985 |
| DE | 4307142 C1 | 5/1994 |
| DE | 102008019234 A1 | 11/2008 |
| DE | 202012100849 U1 | 5/2012 |
| DE | 102011083451 A1 | 3/2013 |
| EP | 2147775 A2 | 1/2010 |
| EP | 2316783 A1 | 5/2011 |
| EP | 3247670 B1 | 11/2018 |
| JP | S59162056 U | 10/1984 |
| JP | 2005333827 A | 12/2008 |
| WO | 1996027553 A1 | 12/1996 |
| WO | 2005065493 A1 | 7/2005 |
| WO | 2009103173 A1 | 8/2009 |
| WO | 2013041894 A1 | 3/2013 |
| WO | 2016118831 A1 | 7/2016 |

OTHER PUBLICATIONS

Notification Concerning Transmittal of International Preliminary Report on Patentability (Chaper I of the Patent Cooperation Treaty), issued in International Application No. PCT/US2016/014474, dated Aug. 3, 2017; 8 pages.

Notification Concerning Transmittal of International Preliminary Report on Patentability (Chaper I of the Patent Cooperation Treaty), issued in International Application No. PCT/US2016/014476, dated Aug. 3, 2017; 7 pages.

Notification Concerning Transmittal of International Preliminary Report on Patentability (Chaper I of the Patent Cooperation Treaty), issued in International Application No. PCT/US2016/014480, dated Aug. 3, 2017; 8 pages.

Notification Concerning Transmittal of International Preliminary Report on Patentability (Chaper I of the Patent Cooperation Treaty), issued in International Application No. PCT/US2016/014482, dated Aug. 3, 2017; 8 pages.

Notification Concerning Transmittal of International Preliminary Report on Patentability (Chaper I of the Patent Cooperation Treaty), issued in International Application No. PCT/US2016/014525, dated Aug. 3, 2017; 9 pages.

Notification Concerning Transmittal of International Preliminary Report on Patentability (Chaper I of the Patent Cooperation Treaty), issued in International Application No. PCT/US2016/014576, dated Aug. 3, 2017; 7 pages.

Translation of CH 683840 A5, Antonio Betere Cabeza, published May 31, 1994.

Translation of DE 3540233 A1, Josef Rosier, published May 14, 1985.

Notification of Transmittal of The International Search Report and The Written Opinion of the International Searching Authority, or the Declaration, issued in International Application No. PCT/US2016/014480, dated Jun. 21, 2016; 5 pages.

(56) References Cited

OTHER PUBLICATIONS

Written Opinion of the International Searching Authority, issued in International Application No. PCT/US2016/014480, dated Jun. 21, 2016; 6 pages.
Notification of Transmittal of The International Search Report and The Written Opinion of the International Searching Authority, or the Declaration, issued in International Application No. PCT/US2016/014473, dated Apr. 4, 2016; 5 pages.
Notification of Transmittal of The International Search Report and The Written Opinion of the International Searching Authority, or the Declaration, issued in International Application No. PCT/US2016/014476, dated Apr. 4, 2016; 10 pages.
Notification of Transmittal of The International Search Report and The Written Opinion of The International Searching Authority, or The Declaration, issued in International Application No. PCT/US2016/014525, dated Apr. 8, 2016; 11 pages.
Written Opinion of the International Searching Authority, issued in International Application No. PCT/US2016/014473, dated Apr. 4, 2016; 6 pages.
Written Opinion of the International Searching Authority, issued in International Application No. PCT/US2016/014476, dated Apr. 4, 2016; 10 pages.
Goldman R.P., et al: "A Constraint-Based Scheduler for Batch Manufacturing," IEEE Expert, IEEE Service Center, New York, NY, US. vol. 12, No. 1: Jan. 1, 1997, pp. 49-56, XP000689724.
Notification of Transmittal of The International Search Report and The Written Opinion of The International Searching Authority, or The Declaration, issued in International Application No. PCT/US2016/014474, dated Apr. 19, 2016; 6 pages.
Notification of Transmittal of The International Search Report and The Written Opinion of The International Searching Authority, or The Declaration, issued in International Application No. PCT/US2016/014482, dated Apr. 20, 2016; 6 pages.
Notification of Transmittal of The International Search Report and The Written Opinion of the International Searching Authority, or the Declaration, issued in International Application No. PCT/US2016/014576, dated Apr. 25, 2016; 4 pages.
Written Opinion of the International Searching Authority, issued in International Application No. PCT/US2016/014474, dated Apr. 19, 2016; 6 pages.
Written Opinion of the International Searching Authority, issued in International Application No. PCT/US2016/014482, dated Apr. 20, 2016; 6 pages.
Written Opinion of the International Searching Authority, issued in International Application No. PCT/US2016/014576, dated Apr. 25, 2016; 6 pages.
Elektroteks, Automatic Mattress Production Line, Jan. 9, 2013, Vimeo Video, https://vimeo.com/57094698 (Year: 2013).
Elektroteks, Fullpack, Jan. 9, 2013, Vimeo Video, https:11vimeo.com/57096497 (2013).

* cited by examiner

AUTOMATED MATTRESS MANUFACTURING PROCESS AND APPARATUS

CROSS-REFERENCE TO RELATED APPLICATIONS

This application is a NON-PROVISIONAL of and claims the benefit of U.S. Provisional Application No. 62/106,938, filed Jan. 23, 2015, U.S. Provisional Application No. 62/106,951, filed Jan. 23, 2015, and U.S. Provisional Application No. 62/147,887, filed Apr. 15, 2015, which are incorporated herein by reference in their entirety.

BACKGROUND

The present disclosure generally relates to mattress manufacture, and more particularly, to an automated mattress manufacturing process and apparatus for manufacturing mattresses, e.g., pocketed coil containing mattresses.

Current processes for manufacturing a mattress include numerous steps that are performed utilizing manual labor. Not surprisingly, the assembly process has inherent variability as these particular steps are operator driven and manually performed. Moreover, the time to perform the above described processes can be lengthy.

BRIEF SUMMARY

Disclosed herein are automated systems and processes for fabricating a mattress. In one embodiment, the automated system includes a plurality of stations including an automated coil unit assembly station comprising a coiler in operative communication with a coil staging apparatus to form a continuous string of pocketed coils; an automated innercore assembly station in operative communication with the coil staging apparatus configured to receive and cut the continuous string of pocketed coils to form string segments of the pocketed coils, and assemble and adhesively attach rows of the string segments to define a pocketed spring innercore; an automated bucket assembly station in operative communication with the automated innercore assembly to receive the pocketed spring innercore, wherein the automated bucket assembly station is configured to form a foam bucket defined by a foam base layer and foam side rails about a perimeter thereof to form a cavity, wherein the innercore is inserted into the foam bucket to form an innercore unit and bucket assembly; and an automated foam pick layer pick and place assembly station for placing and securing one or more foam layers onto the innercore unit and bucket assembly; a common conveyor for serially conveying an output from the automated coil unit assembly station to the automated innercore assembly station to the automated bucket assembly station and to the automated foam pick layer pick and place assembly station to form the innercore and bucket assembly including one or more foam layers disposed thereon; and a manufacturing execution system and programmable logic control for planning, scheduling, and controlling the plurality of stations.

The disclosure may be understood more readily by reference to the following detailed description of the various features of the disclosure and the examples included therein.

BRIEF DESCRIPTION OF THE SEVERAL VIEWS OF THE DRAWINGS

Referring now to the figures wherein the like elements are numbered alike.

DETAILED DESCRIPTION

Figure 1:
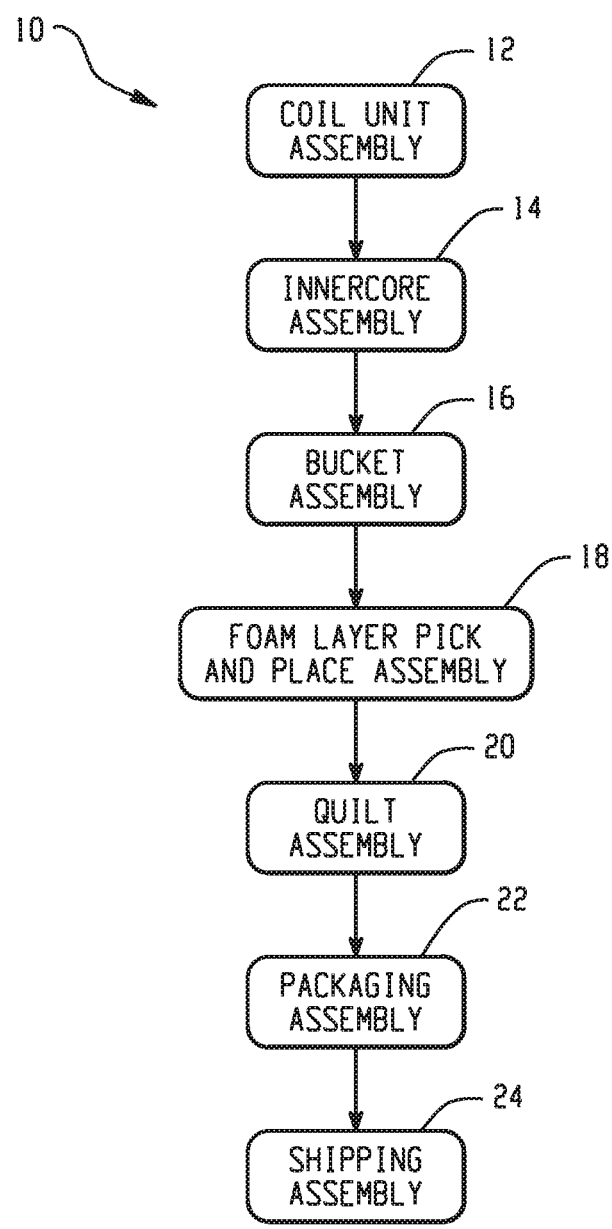
FIG. 1 schematically illustrates an automated mattress assembly process flow and cell layout.

Disclosed herein are automated systems and processes for manufacturing mattresses. As shown in FIG. 1, the automated system 10 and process for manufacturing mattresses generally includes multiple stations for coil unit assembly 12, innercore unit assembly station 14, innercore and bucket assembly 16, and foam layer pick and placement onto the innercore and bucket assembly 18. Each station in the automated system 10 includes a common conveyor, e.g., a plurality of tables including motorized rollers and coplanar transport surfaces, in serial communication therewith to automatically transport the mattress as it is being manufactured. In some instances, an automated guide vehicle may be utilized to facilitate transfer of specific components to the different stations so as to complete the assembly within an individual station, thereby further automating the assembly thereof. For example, different foam layers, side rails, or the like, may be selected from a computer controlled inventory and brought to the respective system for assembly. Optionally, the automated system 10 may further include stations for quilt assembly 20, packaging assembly 22 and shipping assembly 24, wherein the conveyor is in serial communication therewith to provide an automated system and process for fabricating a mattress from start to finish as well as packaging and readying the mattress for over the highway shipping. The automated system can be configured to provide the packaged mattress in close proximity to loading docks for convenient access to the vehicles utilized or shipping. A manufacturing execution system and programmable logic control for planning, scheduling, and controlling the plurality of stations.

Figure 2:
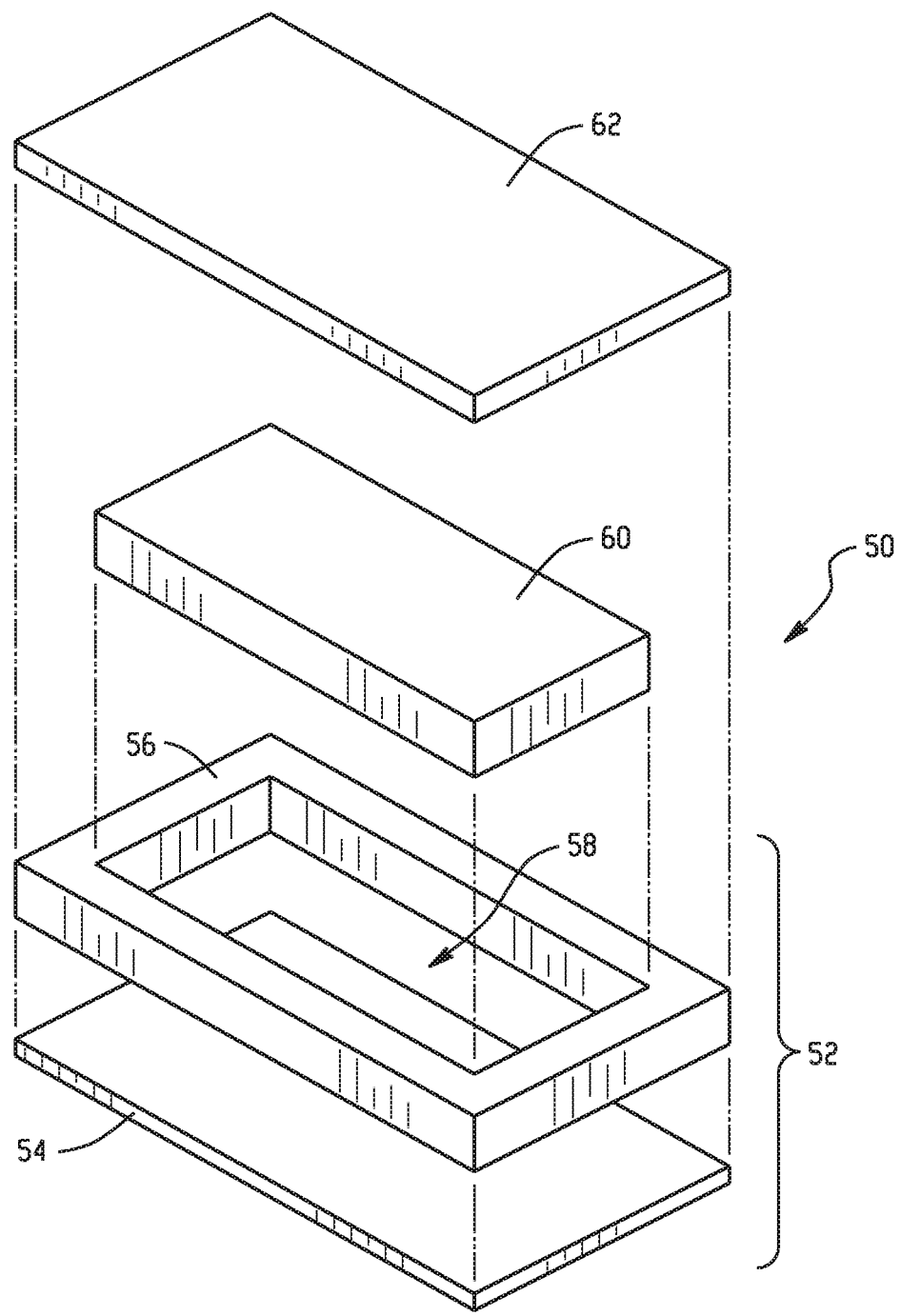
FIG. 2 illustrates an exploded perspective view of an exemplary assembled innercore unit and bucket assembly including a foam topper layer disposed thereon.

The illustrated automated system 10 is configured to fabricate various types of mattresses. FIG. 2 depicts an exemplary exploded perspective view of innerspring mattress 50 including an innercore unit and bucket assembly with foam topper layers. The bucket 52 generally includes a planar base layer 54 dimensioned to approximate the length and width dimensions of the intended mattress. The planar base layer 54 may consist of foam, fiber pad or it may comprise a wooden, cardboard, or plastic structure selected to provide support to the various components that define the mattress, e.g., innercore unit, side, end rails, and the like. Depending on the innercore unit selected and its inherent stiffness, stiffer or more compliant base layers may be chosen. By way of example, the planar base layer 54 may be formed of a high density polyurethane foam layer (20-170 pounds-force, also referred to as the indention load deflection (ILD)), or may be formed of several foam layers (20-170 pounds-force ILD each), that alone or in combination, provide a density and rigidity suitable for the intended mattress manufacture. Other foams or fiber pads may be used. Such a choice is well within the skill of an ordinary practitioner.

An end and side rail assembly 56, which can be manufactured as a single piece or as multiple pieces, is affixed about the perimeter of the planar base layer 54 to define the bucket. The end and side rail assembly 56 is typically constructed from a dense natural and/or synthetic foam material of the type commonly used in the bedding arts. The foam may be (but is not limited to) latex, polyurethane, or other foam products commonly known and used in the bedding and seating arts and having a suitable density. A typical density is about, but not limited to 1.0 to 3.0 lb/ft$^3$ and more typically 1.5 to 1.9 lb/ft$^3$, and a hardness of 35 to 70 ILD, and more typically 40 to 65. One example of such a foam is the high density polyurethane foam and is commercially available from the Foamex Corporation in Linwood, Ill. Alternatively, any foam having a relatively high indention load deflection (ILD) would be satisfactory for the manufacture of the end and side rail assembly. Although a specific foam composition is described, those skilled in the art will realize that foam compositions other than one having this specific density and ILD can be used. For example, foams of various types, densities, and ILDs may be desirable in order to provide a range of comfort parameters to the buyer.

The size of the end and side rail assembly 56 can vary according to the mattress size and application, but each rail typically measures 3-10 inches (7.5-25 cm) in thickness. The depicted end and side rails are typically equal in width, and their length is chosen to correspond to the length of the size of mattress desired. For a regular king size or queen size mattress, the length of rails can be about 78.5 inches (200 cm), although the length can vary to accommodate the width of the header or footer, if the header or footer is to extend across the full width of the base platform 102. Similarly, the header/footer piece typically has a thickness of about 3-10 inches (7.7-25 cm), and the width is chosen to correspond to the width of the size of mattress desired. In the case of a regular king size mattress the width would be about 75.25 inches (191 cm), and for a queen size mattress, the width would be about 59.25 inches (151 cm), depending on how the foam rails are arranged to form the perimeter sidewall.

The end and side rail assembly 56 can be mounted or attached to base layer 54 by conventional means, such as (but not limited to) gluing, stapling, heat fusion or welding, or stitching.

The bucket 52 formed of the base layer 53 and end and side rail assembly 56 as constructed defines a well or cavity 58. The well or cavity 58 provides a space in which the innercore unit 60 can be inserted.

As noted above, the innercore unit 60 may be comprised of conventional helical or semi-helical coil springs and/or foam known and used in the art today. The coil springs may be open or encased in a fabric material, either individually in pockets, in groups, or in strings joined by fabric, all of which are well-known in the bedding art. For many years, one form of spring assembly construction has been known as Marshall Construction. In Marshall Construction, individual wire coils are each encapsulated in fabric pockets and attached together in strings which are arranged to form a closely packed array of coils in the general size of the mattress. Examples of such construction are disclosed in U.S. Pat. Nos. 685,160, 4,234,983, 4,234,984, 4,439,977, 4,451,946, 4,523,344, 4,578,834, 5,016,305 and 5,621,935, the disclosures of which are incorporated herein by reference in their entireties.

Alternatively, the innercore unit 60 may be formed of foam or a combination of foam and coils springs. The foam, in some embodiments, can be a monolithic block of a single type of resilient foam selected from foams having a range of densities (themselves well-known in the art) or multiple foam layers for supporting one or more occupants during sleep. In one embodiment, foam within the innercore unit is made of any industry-standard natural and/or synthetic foams, such as (but not limited to) latex, polyurethane, or other foam products commonly known and used in the bedding and seating arts having a density of 1.5 to 1.9 lb/ft$^3$ and 20 to 35 pounds-force ILD. Although a specific foam composition is described, those skilled in the art will realize that foam compositions other than one having this specific density and ILD can be used. For example, foams of various types, densities, and ILDs may be desirable in order to provide a range of comfort parameters to the buyer.

In an alternative embodiment, the foam innercore unit may comprise one or more horizontal layers of multiple types of foams arranged in a sandwich arrangement. This sandwich of different foams, laminated together, may be substituted for a homogeneous foam block of a single density and/or ILD.

In a further embodiment, the foam core may comprise one or more vertical regions of different foam compositions (including vertical regions having multiple horizontal layers), where the different foams are arranged to provide different amounts of support (also referred to as "firmness" in the art) in different regions of the sleeping surface.

Accordingly, the present disclosure is not limited to any particular type of foam density or ILD or even to a homogenous density/ILD throughout the foam core.

Still further, the innercore unit 60 may comprise one or more air bladders by themselves or in combination with coil springs, foam, or combinations thereof.

The innercore unit and bucket assembly are then overlayed with one or more foam topper layers 62 on the top surfaces, and the whole assembly is encased within a ticking, often quilted, that is sewn closed around its periphery to a border or boxing. After assembly, the mattress can be covered by any other decorative covering or pillow-top. In the present disclosure, the apparatus and process are directed to precision placement and securement of the one or more foam top layers 62 to the top surface of the innercore unit and bucket assembly.

The resulting mattresses produced by the present automated system and process are not intended to be limited and may be of any type, dimension, and/or shape. For example, the mattress may be a foam mattress, a coiled mattress, a foam and coil mattress, an air mattress, combinations thereof, or the like. Typically, the mattress is square or rectangular-shaped and has a thickness ranging from about 4 inches to about 20 inches. The length and width can vary depending on the intended application and typically has a width of about 2 feet to about 7 feet and a length of about 4 feet to about 10 feet, although custom sizes may require smaller or larger dimensions. For convenience, in the present disclosure reference will generally be made to fabrication of a mattress including an innercore formed of pocketed coil springs encased in foam and encapsulated in a quilt fabric layer.

As noted above, the automated system 10 first includes coil unit assembly 12, which is used to form strings of pocketed coils from a wire spool. The coil unit assembly station 12 generally includes a coiler (not shown) and a coil unit staging apparatus. The coiler can be used to form a continuous string of pocketed coil strings. The particular coiler, which are generally well known in the art, is not intended to be limited and may be single head, dual head or the like and. Exemplary coiling apparatuses, i.e., coilers, are shown without limitation, in U.S. Pat. Nos. 4,565,046; 4,439,977; 1,733,660; and 5,613,287; which are incorporated herein by reference in their entireties.

FIGS. 3-6 depict a coil string staging apparatus 100 suitable for use in the present disclosure, which can be utilized to provide a buffer of continuous coil string such that manufacturing down-time is reduced. Specifically, the coil string staging apparatus 100 can be disposed between a coiler and an innercore assembly station such that the coil string staging apparatus receives a continuous coil string that is produced by the coiler prior to the continuous coil string being sent to the innercore assembly station, also referred to herein as the assembler. In such aspects, the continuous coil string staging apparatus can have a buffer capacity of a portion of the continuous coil string such that there is always continuous coil string available to the assembler.

The term "continuous coil string" as used herein means that a string of coils is substantially unbroken and is substantially longer in length than a segment utilized for an innercore. That is, the coil string is not yet cut to a length needed for producing an innercore for a particular mattress assembly. Typically, a continuous coil string will be cut to the appropriate length at the innercore assembly station during assembly.

As shown, the coil string staging apparatus 100 can include an input 102 from the coiler, a staging buffer 104, and an output 106 to the assembler. The input 102 is configured to receive a continuous coil string 108 from the coiler as it is being produced. As shown, in some aspects the staging buffer 104 can store at least a portion of the continuous coil string 108. Still further, the output can be configured to output—or discharge—the portion of the continuous coil string 108 that is stored in the staging buffer 104.

Figure 3:
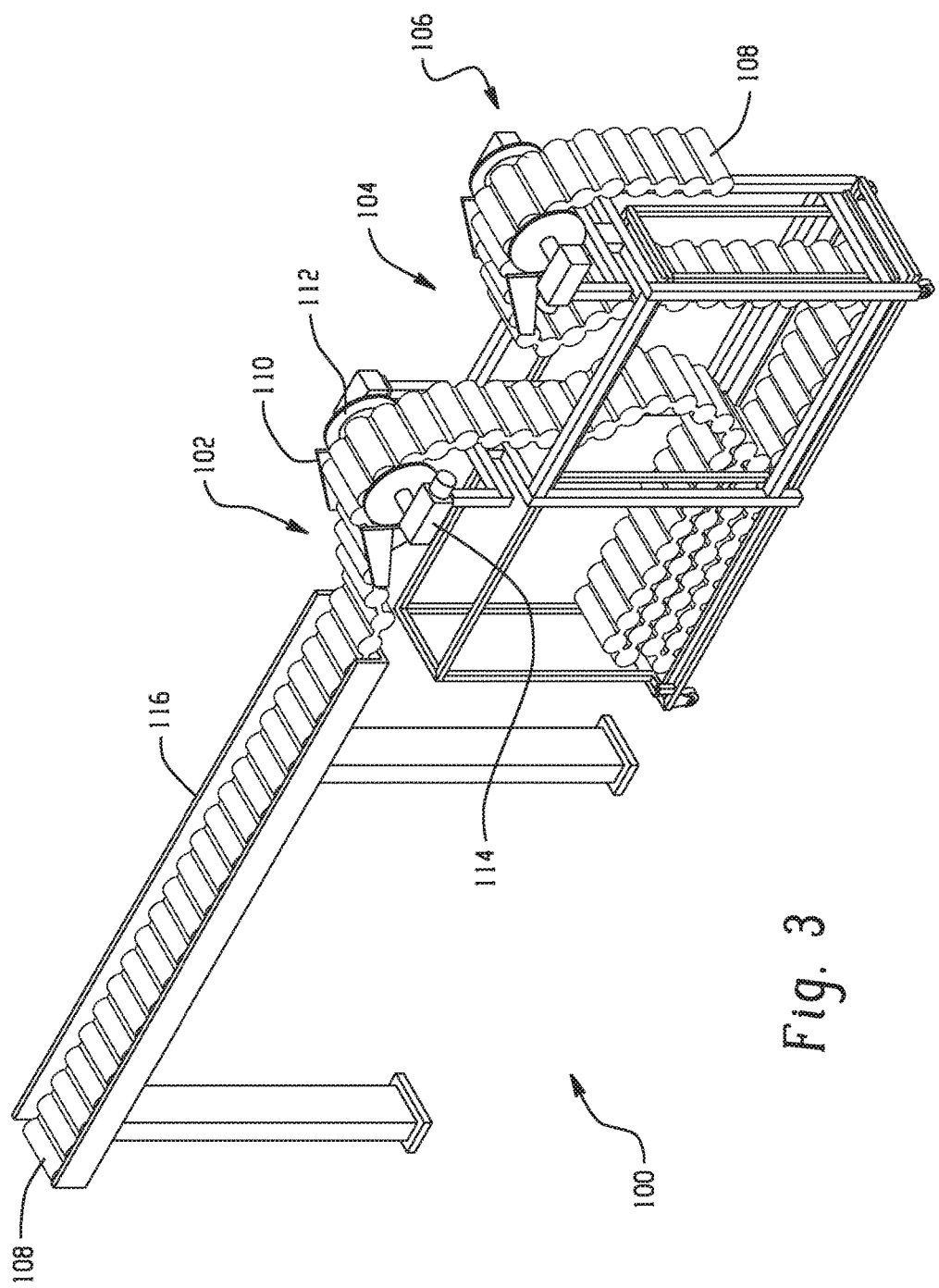
FIG. 3 is a perspective view of an automated continuous coil string staging apparatus.
Figure 4:
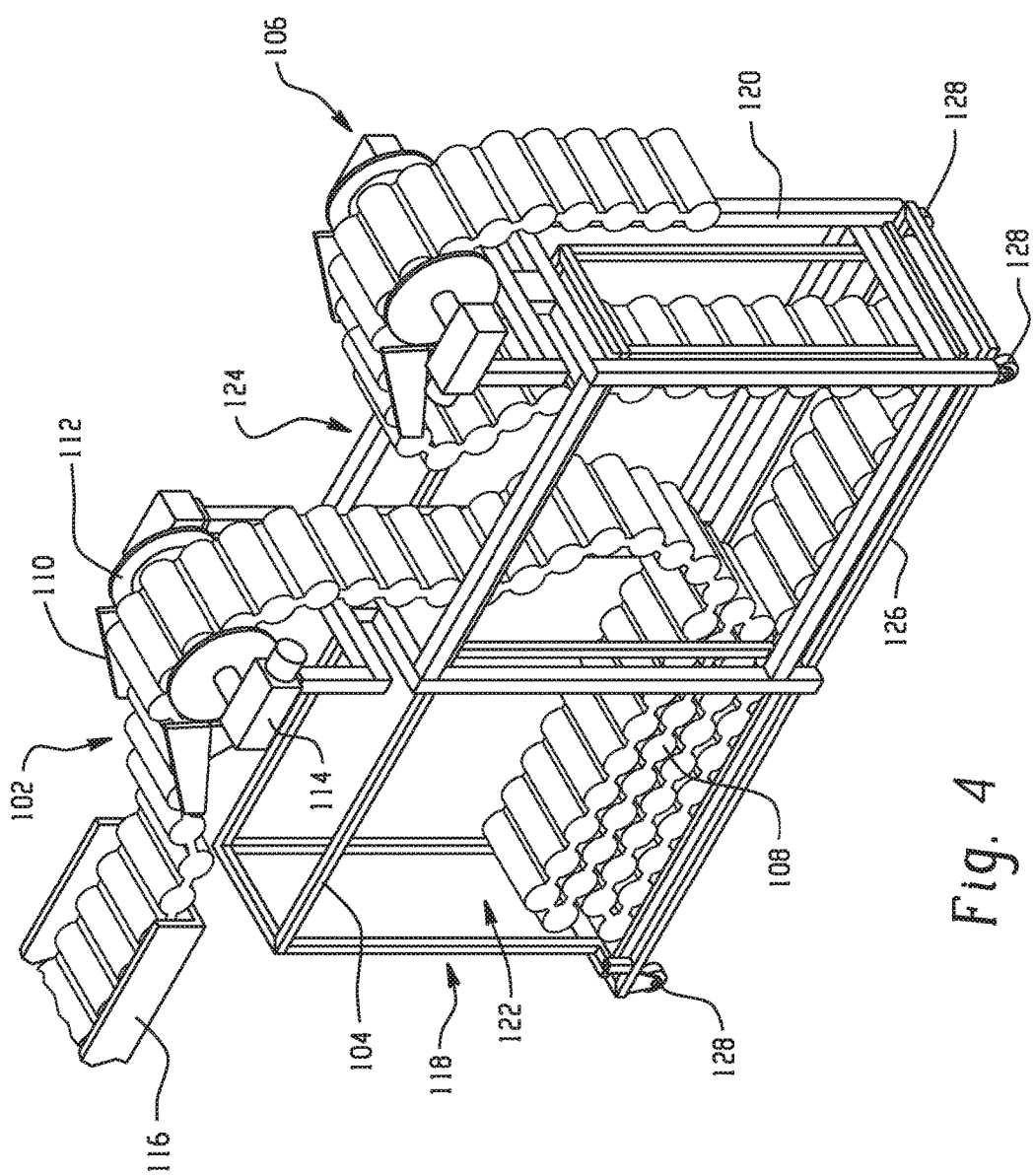
FIG. 4 is a perspective view of the continuous coil staging apparatus of FIG. 3.
Figure 5:
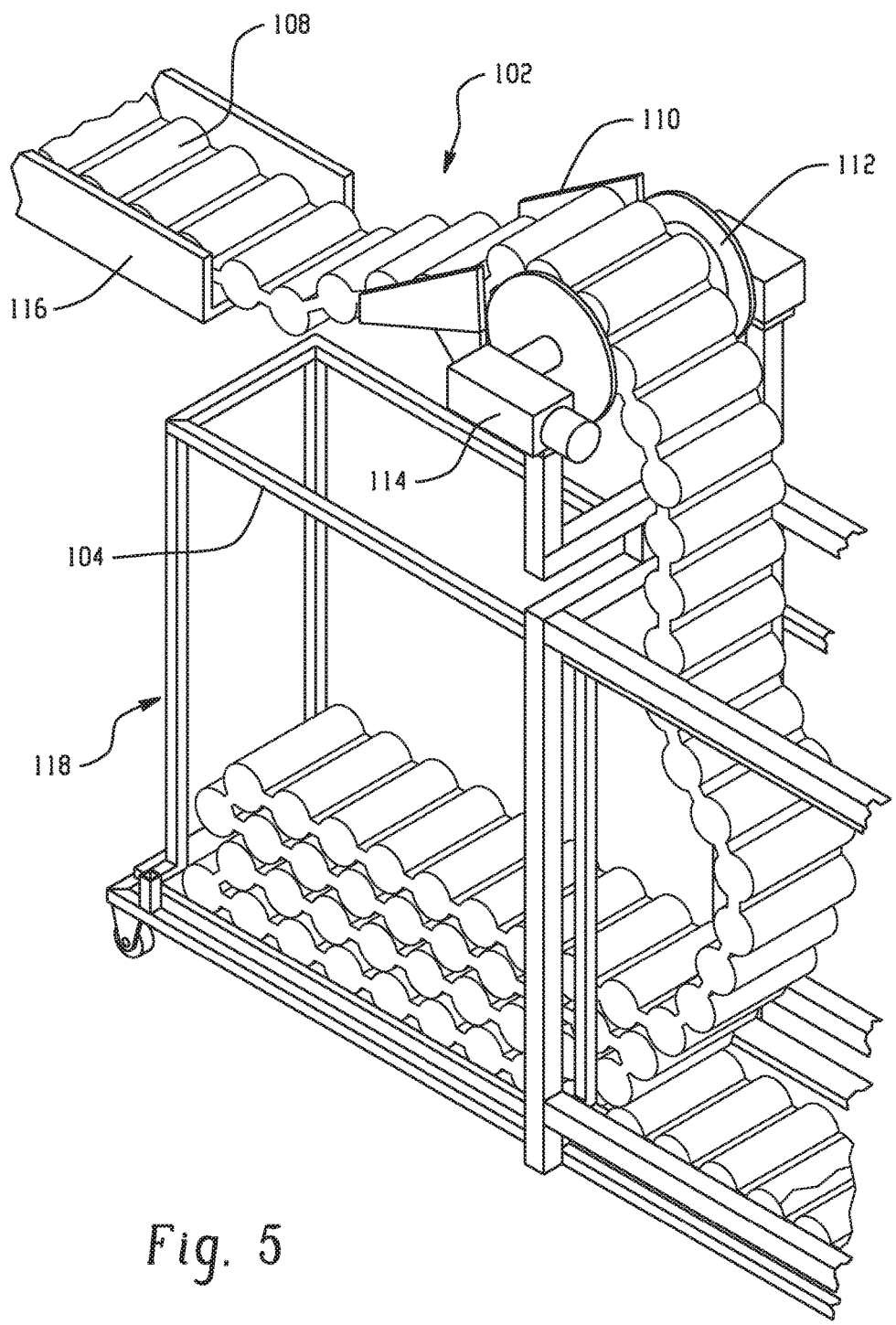
FIG. 5 is a perspective view of the input mechanism of the continuous coil staging apparatus of FIG. 3.

FIGS. 3-5 illustrate, among other things, an example of an input 102 for use with the coil staging apparatus 100. As shown, for example, the input 102 can include a receiving mouth 110 that is configured to receive the coil string 108. Specifically, the mouth 110 can be appropriately dimensioned to allow the string of pocketed coils 108 to pass therethrough unabated. The input 102 can also include a conveyor 112 or conveyor system that is configured to move the string 108 through the input 102. In some aspects, the conveyor 112 includes a motor 114 that is configured to drive the conveyor 112 and thus actively move the coil string 108 through the input. The conveyor 112 can be any conveyor or conveyor system that is capable of moving the string 108 into the staging buffer 104. For example, the conveyor 112 can be any of a wheel, star wheel, belt conveyor, or roller conveyer. In some aspects, the input 102 can be disposed above the staging buffer 104 such that as the string 108 is moved through the input 102 it falls into the staging buffer 104. Additionally and without limitation, the input 102 can be directly coupled to a support on or adjacent to an end of the staging buffer 104. As shown in FIGS. 3-5, the input 102 can also include a guide 116 configured to guide the coil string 108 from the coiler to the conveyor 112 and through the input 102.

A staging buffer 104 for use in the coil string staging apparatus is also illustrated in FIGS. 3-6. In some aspects, the staging buffer 104 is configured to store a buffer of a continuous coil string. As such, the staging buffer 104 can be of any shape that is suitable for storing coil strings such as portions of the continuous coil string 108. For example and without limitation, the staging buffer 104 as shown in FIGS. 3-5, can be generally rectangular in shape. In other aspects, the staging buffer can be square, triangular, round, cylindrical, octagonal, or any other shape.

As shown more clearly in FIG. 4, the staging buffer 104 can have a proximal input end 118, a distal output end 120, a first side wall 122, a second side wall 124, and a floor 126 disposed therebetween. The proximal distal end 118 can be configured to support an input 102—either by having the input 102 disposed an adjacent distance from the proximal end as shown, or by having the input 102 disposed directly over the end 118 (not shown). The distal output end 120 can be configured to support an output 106 either by having the output 106 disposed an adjacent distance from the distal end 120, or by having the output 106 disposed directly over the end 120 as shown in FIG. 4. First and second side walls 122, 124 can span between the proximal end 118 and the distal end 120. The floor 126 also spans between the proximal and distal ends 118, 120, as well as the first and second side walls 122, 124. Optionally, in some aspects, the staging buffer 104 can include casters 128 such that the staging buffer can be easily maneuvered.

In some aspects, the staging buffer 104 can be at least partially transparent such that any coil string stored within the staging buffer is visible through at least a portion of the staging buffer. For example, the first side wall 122, the second side wall 124, the proximal end 118, and/or the distal end 120 can be formed of transparent material such as glass, plastics, polymethyl methacrylate (Plexiglass™), perforated plastic or metal sheeting, plastic or wire meshes, hardware cloths, or any other material that allows the coils to be seen when stored in the staging buffer. In some aspects, only a portion of the staging buffer can be transparent as described. For example, the first side wall 122 can optionally include a window (not shown) formed of transparent material.

As shown in FIGS. 3-6, the staging buffer 104 can be dimensioned and configured to store any length of coil string. For example, the staging buffer can have a width (such as is defined by a width of the floor 126) that is greater than a width of the continuous coil string. That is, the distance between the first side wall 122 and second side wall 124 is greater than the width of the coil string. The width can be sufficient to store only a single coil string, or optionally, multiple rows of coil string. In some aspects, the staging buffer 104 can be configured to store any buffer amount of coil string that is desired. For example, the staging buffer 104 can be configured to store at least enough continuous coil string 108 to form one entire mattress assembly. Alternatively, the staging buffer 104 can be configured to store less than one mattress assembly worth of coil string, such as half of a mattress assembly, one row of a plurality of rows that form a mattress assembly, or any other amount sufficient to maintain mattress assembly production goals. For example and without limitation, if a mattress assembly requires ten (10) rows of coil strings that are each ten (10) feet in length, then the length of continuous coil string required to produce one mattress assembly is about one hundred (100) feet. Thus, in that example, the staging buffer 104 can be configured to store at least about one hundred (100) feet of continuous coil string 108. Additionally, the staging buffer, in some aspects, can be dimensioned such that the coil string, when input into the staging buffer, remains untangled and neatly stacked such that the continuous coil string can easily pay out (i.e., discharge) from the staging buffer.

Figure 6:
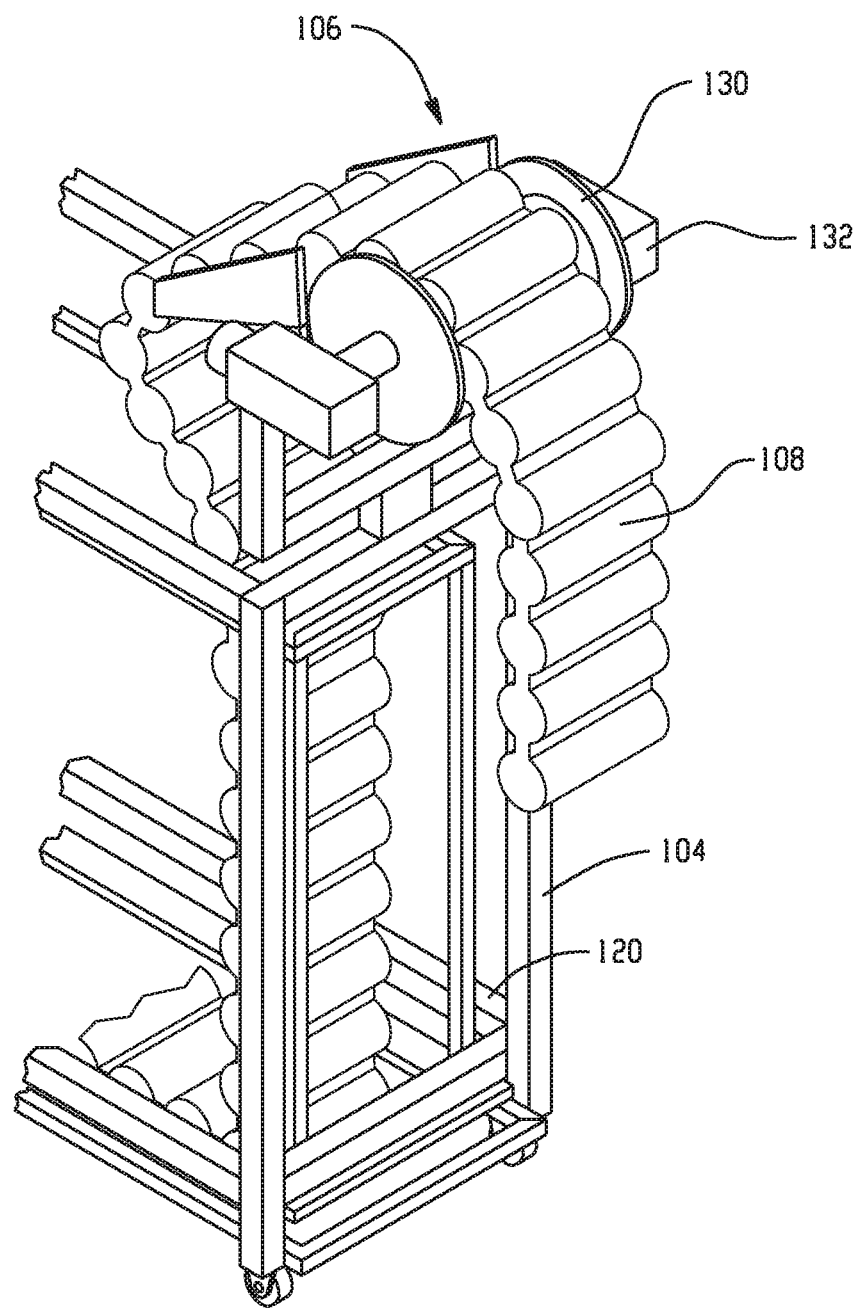
FIG. 6 is a perspective view of the output mechanism of the continuous coil staging apparatus of FIG. 3.

FIG. 6 illustrates an example of an output 106 coupled to a distal end of a staging buffer 104. As shown, the output 106 is configured to receive the continuous coil string 108 from the staging buffer 104. The output 106 can be appropriately dimensioned to allow the string 108 to pass therethrough. The output 106 can be configured to either actively output or passively output the continuous coil string. "Actively output" as used herein means that the output conveyor is driven such that the output conveyor directly pulls the coil string from the staging apparatus. For example, actively outputting a coil string can include using an output conveyor that is driven by a motor such that the coil string is pulled from the buffer. "Passively output" as used herein means that the output conveyor is not driven such that the output conveyor guides the coil string from the staging apparatus when the string is pulled out of the staging apparatus by a downstream process, such as the assembler.

For example, the output 106 can include a conveyor 130 or conveyor system that is configured to move the string 108 through the output 106. In some aspects, the conveyor includes a motor 132 that is configured to drive the conveyor 130 and thus actively move the coil string 108 through the output. The conveyor 130 can be any conveyor or conveyor system that is capable of moving the string 108 into the staging buffer 104. For example, the conveyor 130 can be any of a wheel, star wheel, belt conveyor, and/or roller conveyer. In some aspects, the output 106 can be disposed above the staging buffer 104. Alternatively, the output 106 can be disposed in any location that is suitable to actively or passively output the coil string. Additionally, the output 106 can be directly coupled to a distal end of the staging buffer 104, as shown in FIG. 6. The output can also include a guide (not shown) configured to guide the coil string 108 downstream to the innercore assembly station 14.

Figure 7:
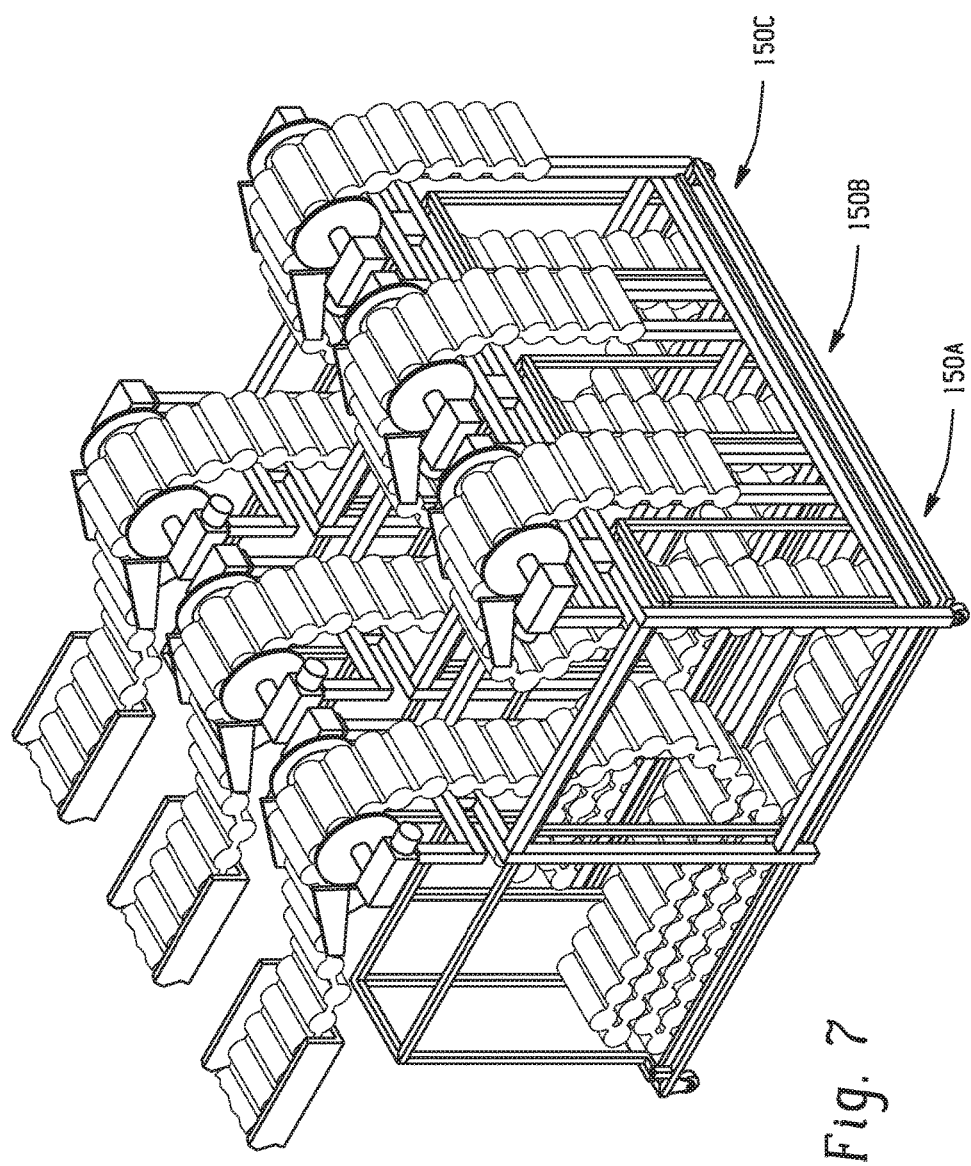
FIG. 7 is a perspective view of a plurality of continuous coil staging apparatuses.

Furthermore, in use, continuous coil string staging systems can include a plurality of coilers, staging apparatuses, and/or innercore assemblers. In some aspects, the system can have one staging apparatus for every one coiler. For example, as shown in FIG. 7, three staging apparatuses 150A, 150B, and 150C can be used to feed a single innercore assembly station. As such, coil string staging systems can include at least one coiler, at least one staging apparatus, and/or at least one assembler.

In some aspects, including but not limited to those having more than one coiler, staging apparatus, or assembler, each portion of the system can be selectively and/or independently controlled such that desired outputs are achieved.

The system can include a variety of sensors configured to monitor various system parameters, including but not limited to the rate and amount of continuous coil string produced by a coiler, the amount of coil string in the staging buffer, the rate that continuous coil string is input to the staging buffer, the rate that continuous coil string is output from the staging buffer, and/or the amount and rate of assembly. For example, the at least one staging apparatus can have an input and an output that are controlled so as to regulate the amount of coil string stored in the staging apparatus and to maximize the amount of mattress assemblies produced. For example, if the coiler stops producing coil string (such as, when performing a wire or fabric changeover), the input to the staging apparatus can be stopped while continuing to operate the output, thus depleting the buffer of coil strings and maintaining operation of the assembler throughout the coiler stoppage.

In other aspects, the multiple staging apparatuses 150A, 150B, and 150C are configured to receive pocketed coils from a coiler that are the same or of a different configuration.

As noted above, one or more of the continuous coil strings 108 from the coil unit assembly station 12 are fed to the innercore assembly station 14, wherein the continuous coil string is cut to a desired length, arranged in rows on an assembly table and adhesively attached to one another to form the desired innercore as will be described in greater detail below. The innercore assembly station 14 can be configured in a variety of manners that are sufficient to produce mattress assemblies. By way of example and without limitation, assemblers are generally described in U.S. Pat. No. 5,746,877, which is incorporated herein by reference in its entirety.

Figure 8:
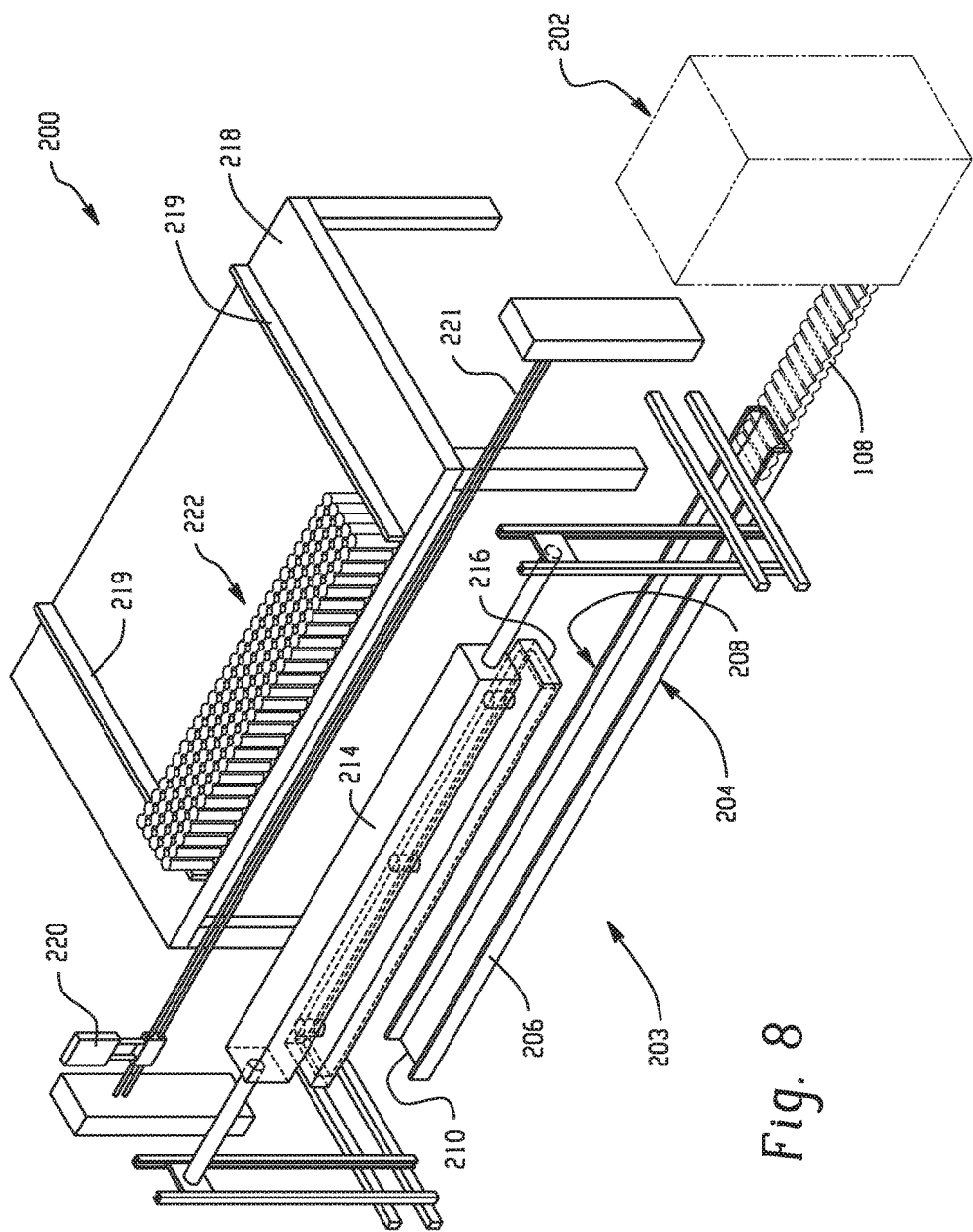
FIG. 8 illustrates a perspective view of an automated innercore assembler.

An exemplary innercore assembly station, generally designated by reference numeral 200 suitable for use in the present disclosure, will now be described and is generally shown in FIG. 8. In some aspects, the innercore assembly station 200 is configured to receive a feedstock of the continuous coil string, e.g., 108, from the staging apparatus 100 as previously described using a feedstock conveyor 202 coupled to a string segment holding and transfer mechanism 203. The feedstock conveyor 202 may be actively powered or passive. A powered feedstock conveyor may include a counter, such as a star wheel, belt drive or the like (not shown), which functions to provide the desired length and number of coils within a given string segment. Multiple counters, e.g., multiple star wheels, or even sensors can be used to process multiple coil strings, wherein each counter conveys a selected string segment of coils having a predetermined length and number of spring coils to a second conveyor 204. The number of spring coils in a particular segment is predetermined based on a desired width (or height, in some embodiments) of the mattress. The coils in the different strings of coils received by each star wheel can have different diameters, spring constants, and the like. Thus, the innercore assembly station can select a particular counter such as the star wheel or alternate between different counters depending on the characteristics of the strings of coils desired for the mattress. Additionally, the multiple counters allow the assembler 200 to process strings of coils from multiple coilers simultaneously.

As discussed above, each counter of the actively powered conveyor 202 feeds the continuous coil string 108 to a second conveyor 204. Once the predetermined number of coils is counted as it is being introduced into the second conveyor, the continuous string 108 is cut to form a coil string segment 109 that is sent to a predetermined location within the second conveyor 204 (see FIG. 9). The second conveyor 204 can include two parallel rotatable belt tracks 206, 208 generally spaced apart at a fixed distance, which is slightly less than the height of the relaxed pocketed coils when vertically oriented, each parallel track gripping opposing ends of the coils in the string segment to move the horizontally oriented coils disposed on a surface 210 between the rotatable tracks 206, 208 to the predetermined location. Surface 210 can be formed of a rotatable track as well. The individual coils of the string of pocket coils are compressed as they are fed into the conveyor 204. Thus, as the cut string segment 109 enters the second conveyor 204, the spring coils in the string exert an outward force against the parallel tracks holding the string in place on the conveyor. After the string segment is cut at a predetermined number of coils, the conveyor further advances the string segment through the conveyor 204 to a predetermined location based on a desired alignment for the string segment on the resulting mattress spring assembly.

Once the string segment is moved to the predetermined location on the second conveyor, the string segment holding and transfer mechanism 203 is moved to a position directly above the string segment 109. The string segment holding and transfer mechanism 203 includes a vertically movable and rotatable carrier 214 including opposing clamping surfaces 216 extending therefrom with a void therebetween, forming a channel. The opposing surfaces are fixed at a predetermined distance from each other that is less than the relaxed height of the incoming spring coils (similar to the distance between the opposing tracks of the conveyor 202). The coils remain compressed when they are inserted into the channel and this compression is what retains the string of pocket coils inside the channel during movement of the carrier. A mechanism in the second conveyor then quickly pushes the string segment up into the channel of the holding mechanism without letting the spring coils relax and expand completely prior to entering the holding mechanism. Because the distance between the opposing surfaces of the channel in the holding mechanism is less than the relaxed height of the spring coils, the spring coils exert an outward force on the opposing fixed surfaces of the channel holding the spring coils in place.

Once the string segment 109 is placed into the channel of the string segment holding and transfer mechanism 203, the carrier 214 moves upward and rotates 90° to be in a position to place the string segment to a mattress spring assembly being formed on a table 218. That is, the string segment 109 is rotated from a horizontal orientation to a vertical orientation. The table 218 can include guide rails 219 to accommodate and maintain alignment of each additional string. The distance between the guide rails is generally equivalent to the desired height or width dimensions of the innercore. As the carrier 214 is rotating 90°, a hot melt adhesive applicator 220 moves across the outer string segment, if present, of the innercore spring assembly being formed to apply an adhesive to the outer string segment. After rotating 90°, the holding mechanism then pushes the string segment out of the channel and against the spring assembly such that the adhesive adheres the string segment to the spring assembly being formed. This process is repeated until the innercore spring assembly having a predetermined number of string segments is formed (the number of string segments is based on the desired length or width of the mattress).

After each string segment is applied to the spring assembly, the adhesive applicator locator 220 traverses the length of the most-recently-applied string segment of the spring assembly being formed via a guide rail 221 and sprays an adhesive to the outer surface of that particular string segment. This adhesive serves to adhere the next string segment being applied by the holding and transfer string segment mechanism. The adhesive applicator comprises a plurality of spray nozzles fixed in a linear array. Additionally, the string segment of the mattress spring assembly being formed is held in a fixed position while the adhesive applicator traverses the length of the string segment. In other words, the adhesive is applied by moving the adhesive applicator along the outer surface of a fixed (i.e., non-moving) string of coils.

Figure 9:
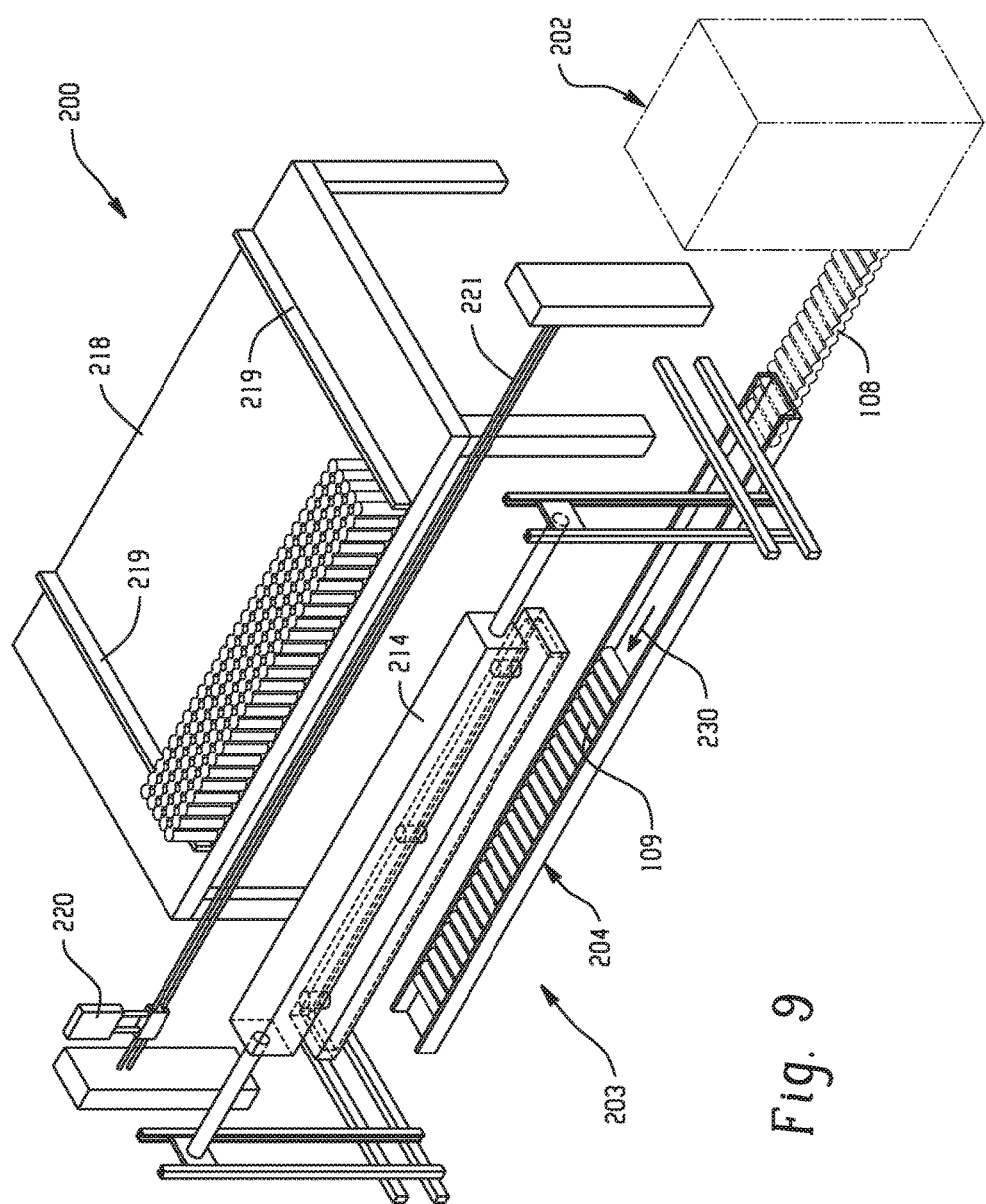
FIGS. 9-16 sequentially illustrate the innercore assembler during manufacture of the innercore.
Figure 10:
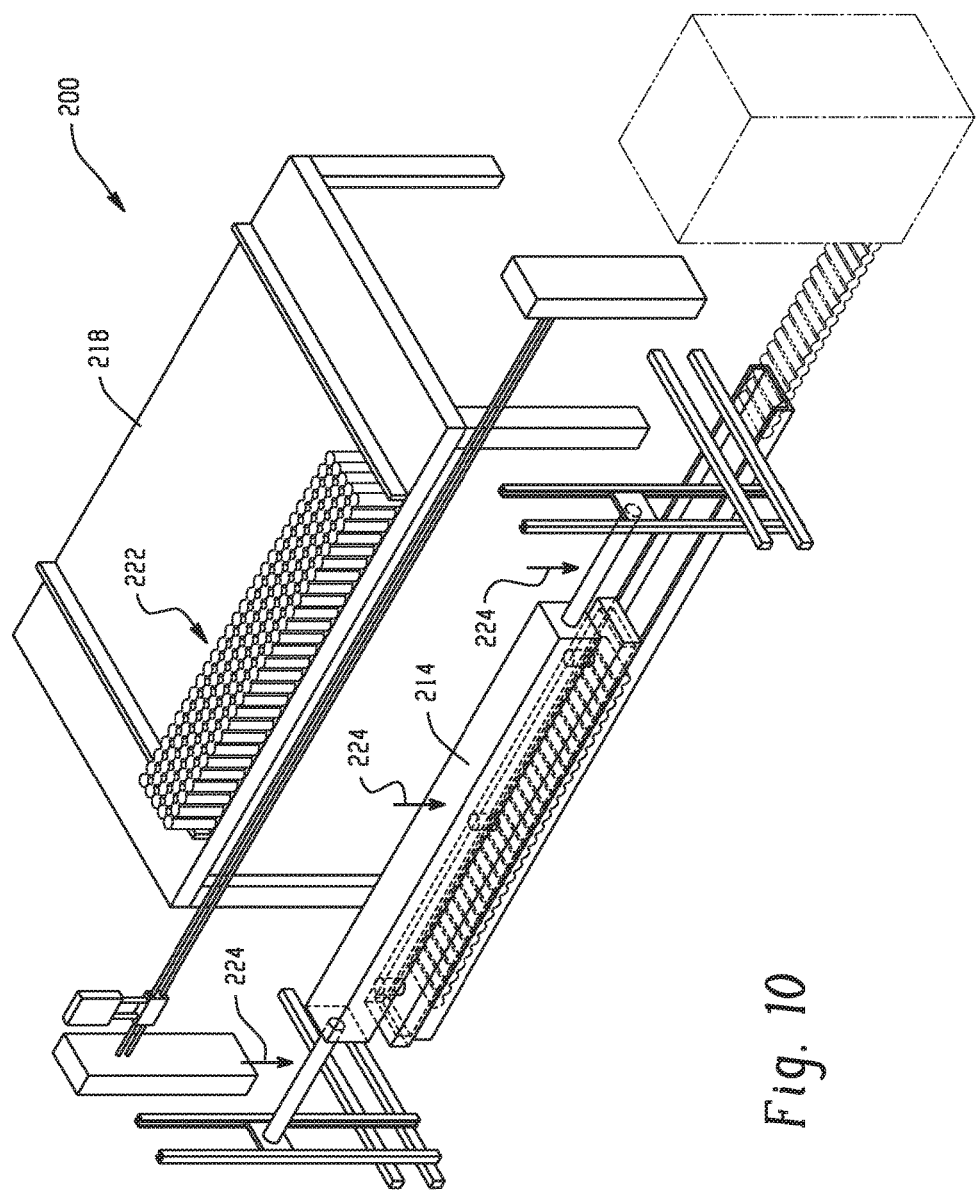
Figure 11:
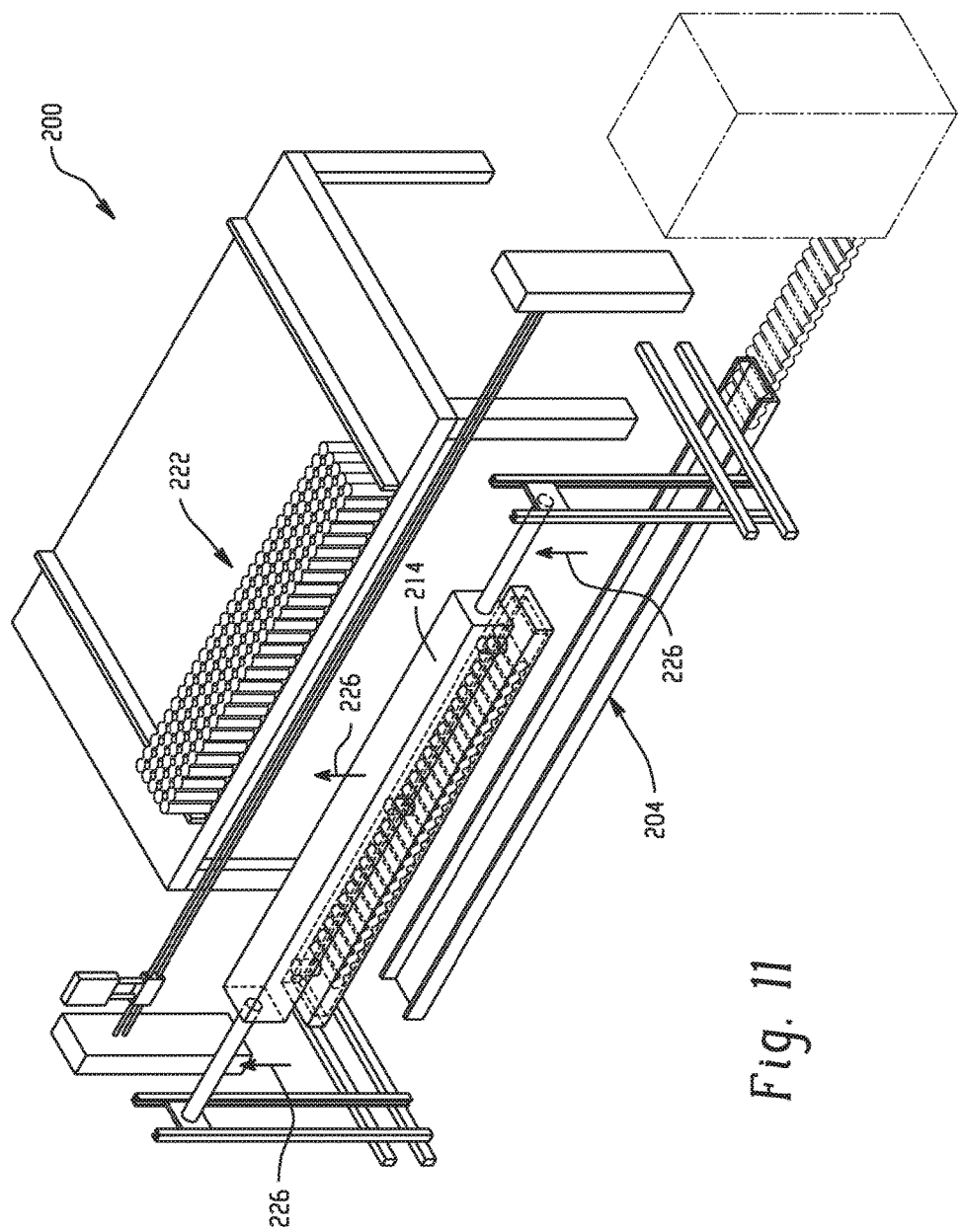
Figure 12:
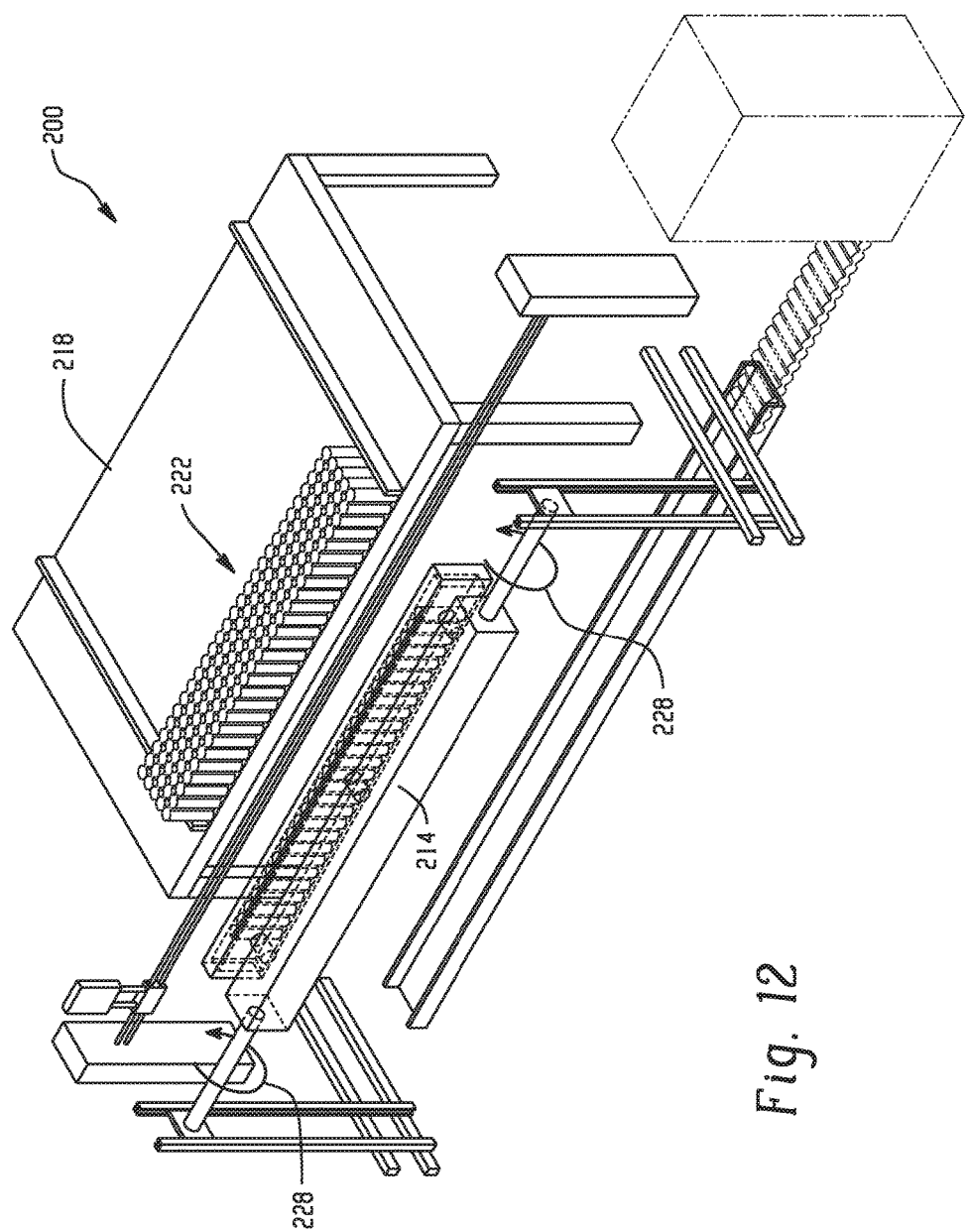
Figure 13:
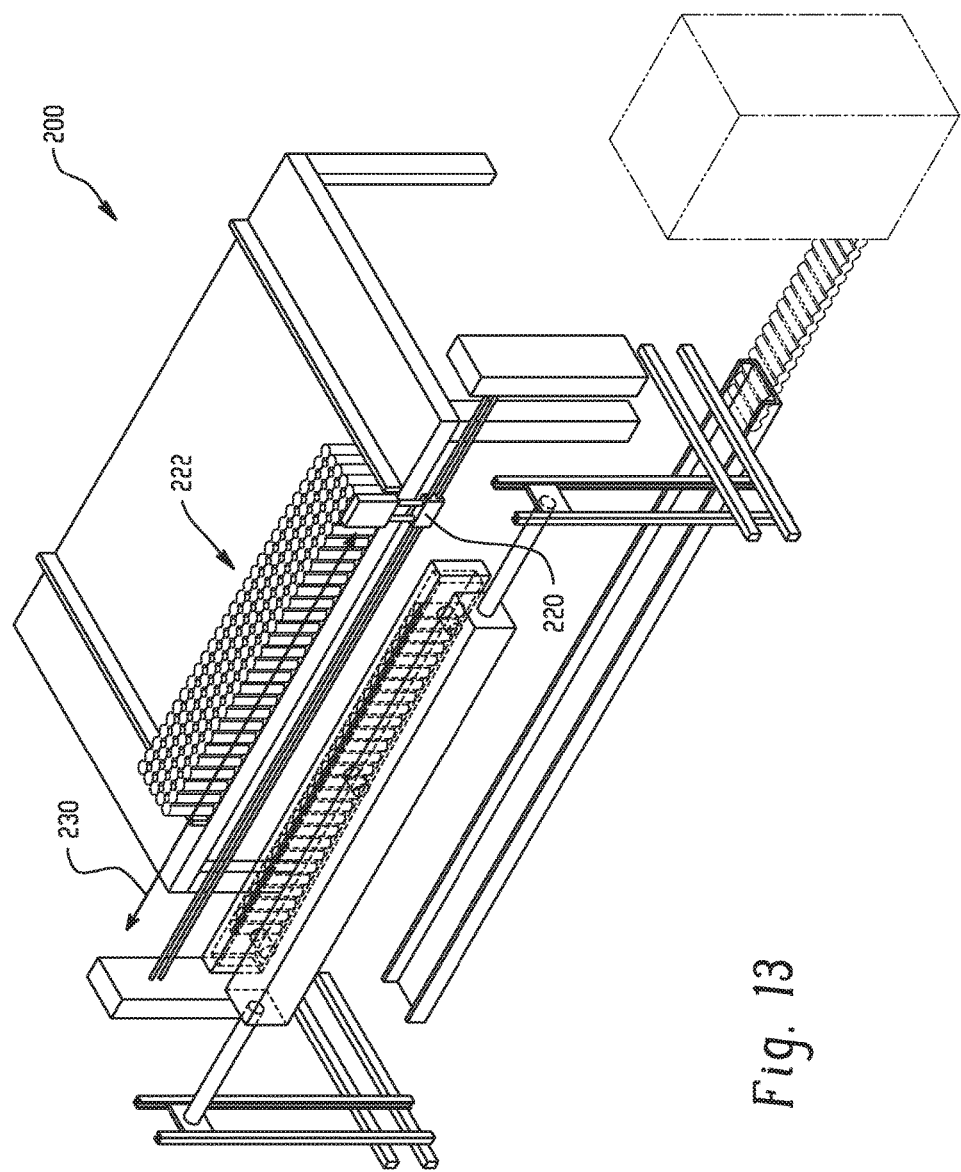
Figure 14:
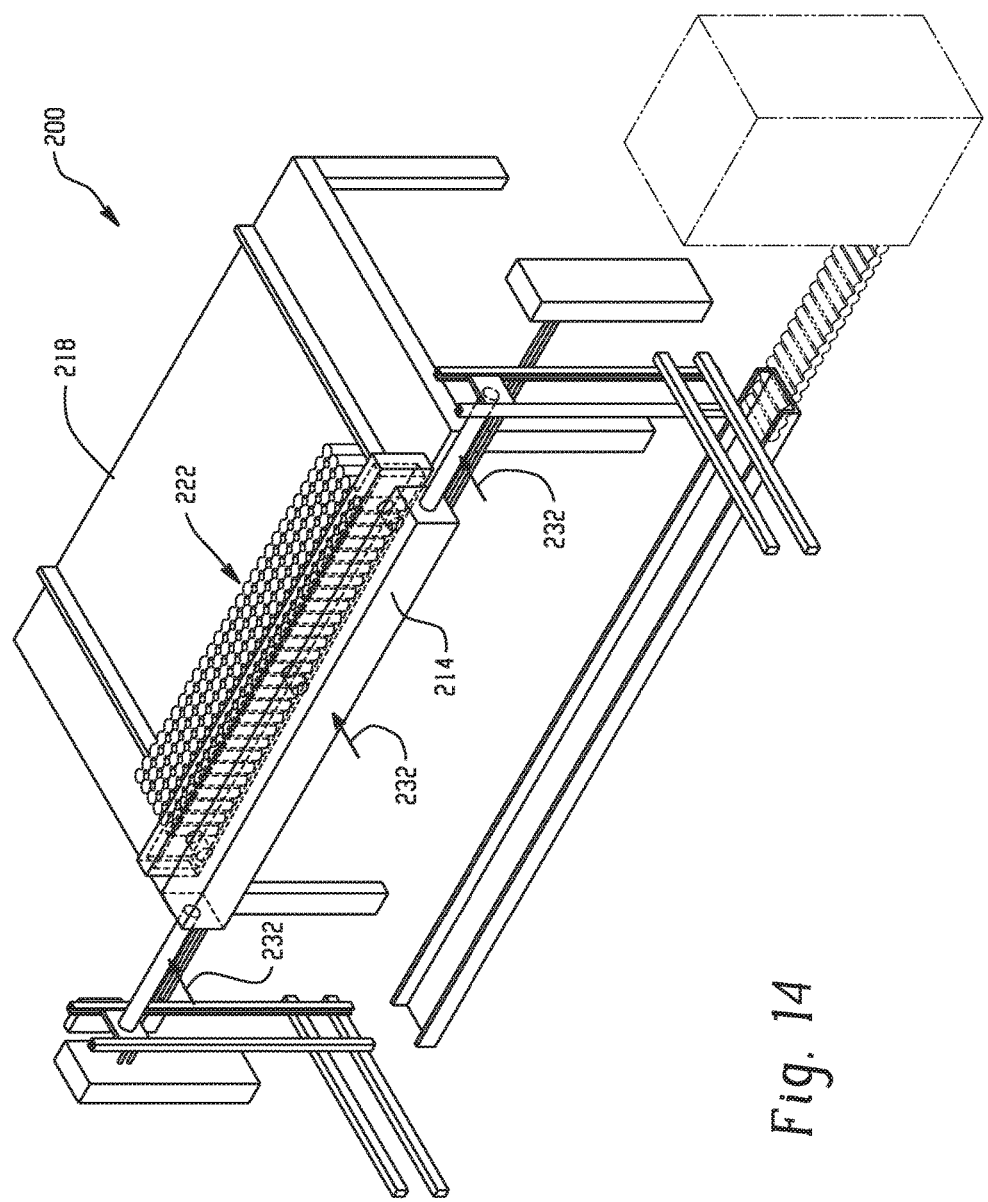
Figure 15:
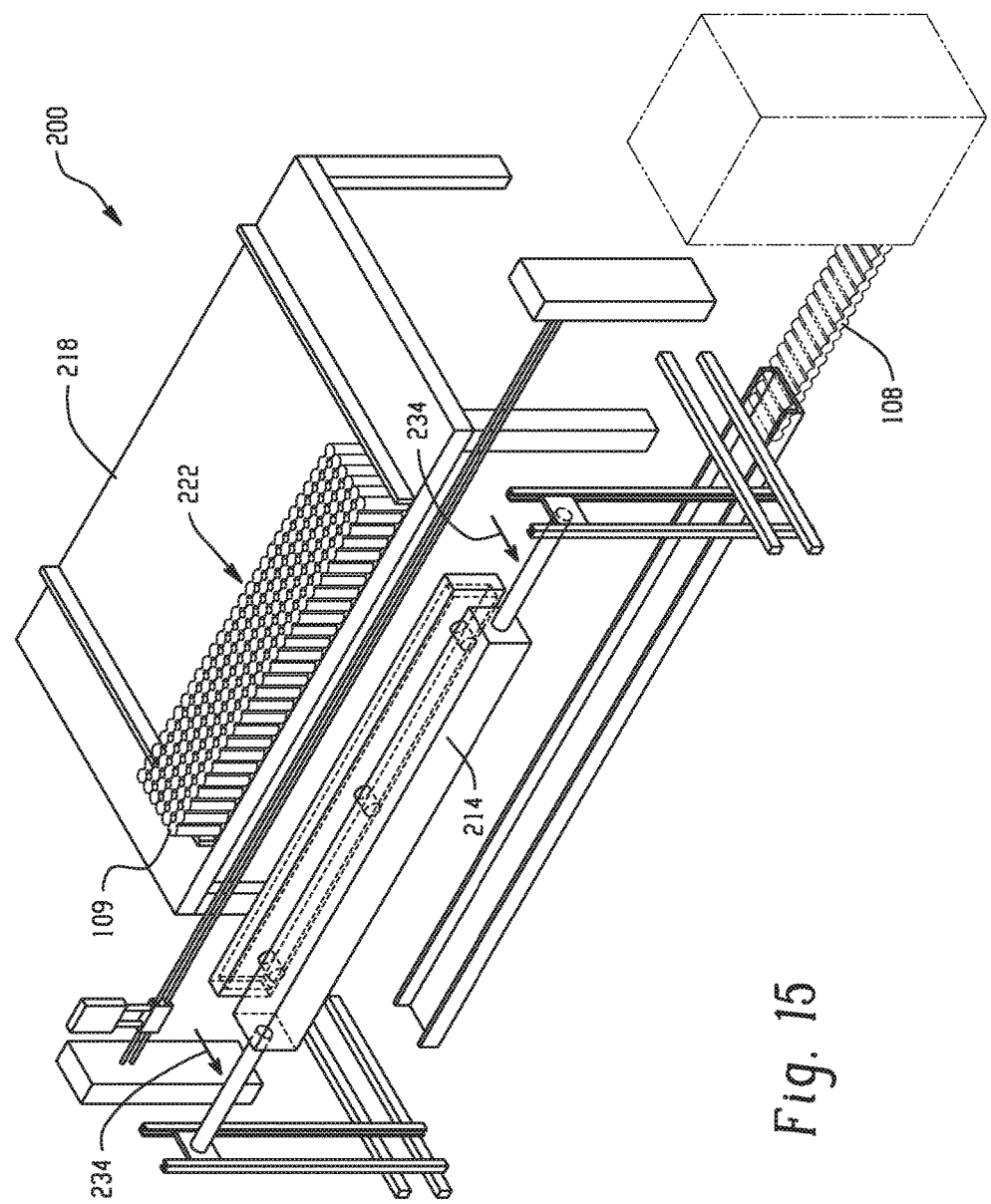
Figure 16:
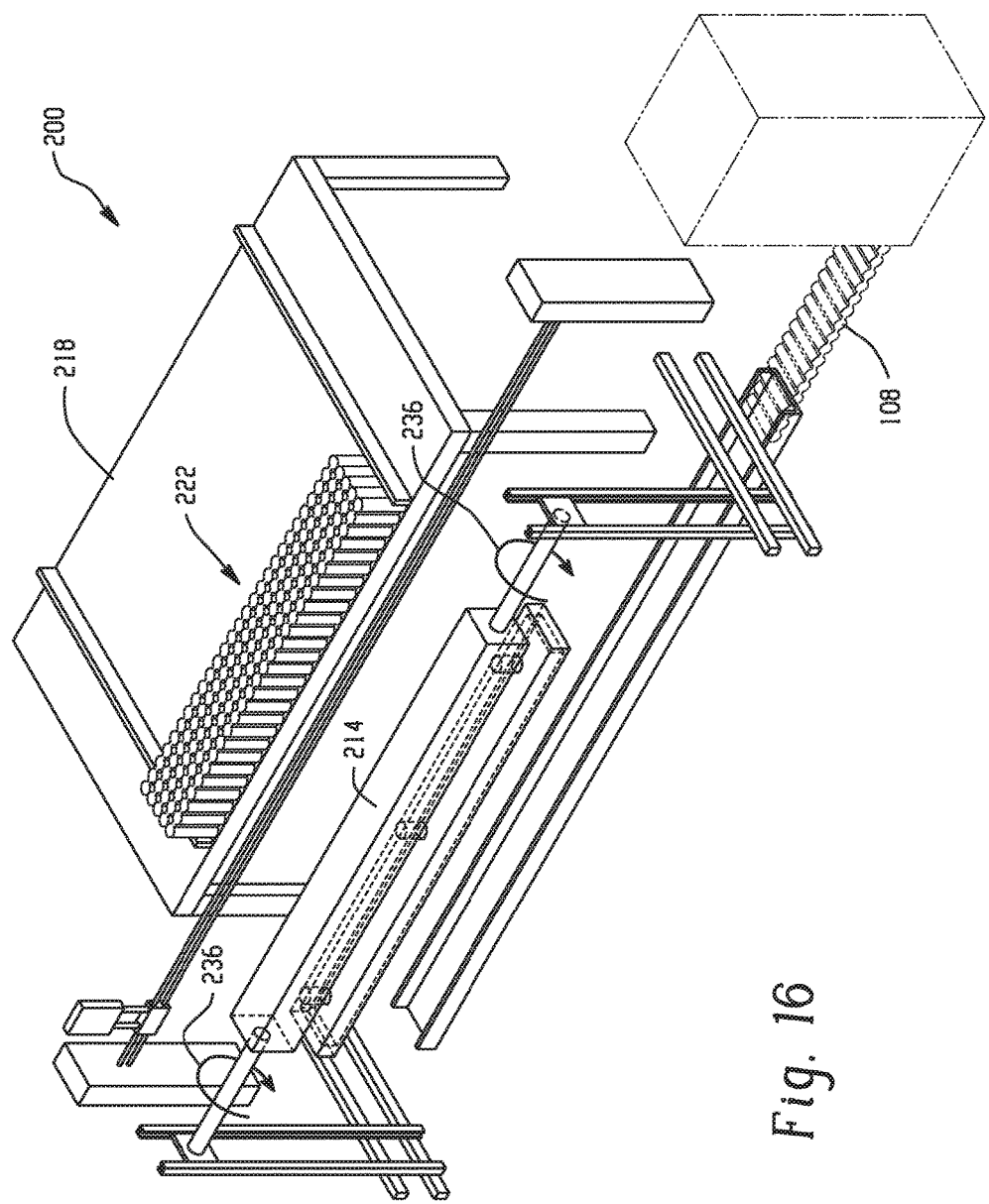

FIGS. 9-16 generally depict the sequential steps for assembling the innercore at the innercore assembly station. In FIG. 9, the continuous coil string, i.e., feedstock, from the coil unit staging station is introduced to the feedstock conveyor 202 and fed to the second conveyor 204. The coils in the continuous coil string 108 are counted and cut to define a string segment 109, which travels along path 230 to a predetermined location within the channel defined by the rotatable tracks 206, 208 of the conveyor 204. In FIG. 10, the carrier 214 of the string segment holding and transfer mechanism 203 is lowered along vertical travel path 224 to with conveyor 204 and grab coil string segment 109. The carrier including coil string segment 109 within the channel is then raised vertically as indicated by arrow 226 in FIG. 11. In FIG. 12, the carrier 214 is rotated counter-clock-wise as indicated by arrow 228 to provide face and align with partially constructed innercore on table 218. In FIG. 13, the adhesive applicator 220 traverses from left to right and back again as indicated by arrow 230 to apply an adhesive to an exposed surface coil string already on table 218. In FIG. 14, the carrier including the string segment 109 is moved toward table 218 as indicated by arrow 232 so as to abut the string segment with a predefined force against the previously assembled string segments, thereby adhesively attaching the string segment 109. The carrier 214 is then retracted from the table 218 as indicated by arrow 234 and rotated clockwise as indicated by arrow 236 so as to return the original position as shown in FIGS. 15 and 16, respectively.

The innercore, once assembled is then moved from table 218 to the common conveyor (not shown) in serial communication with the various stations, e.g., 12, 14, 16, 18, etc. In some instances, the conveyor defines a surface upon which the various sequences are performed to form the mattress or are independent from the station and used for transport to an upstream station such as in the case of the innercore assembly station feeding the assembled innercore to the foam encasement assembly station.

Referring now to FIGS. 34-37, there is depicted a bucket assembly station 500, which generally include a foam rail conveyor 502, an alignment table 504, and a robotic lifting assembly 506 configured to pick and place a foam rail from the foam rail conveyor 502 to the alignment table 504. While the innercore is being assembled, bucket assembly can occur simultaneously, wherein the completed innercore can later be inserted into the assembled bucket 50 (see FIG. 2) at the bucket assembly station 16.

Figure 35:
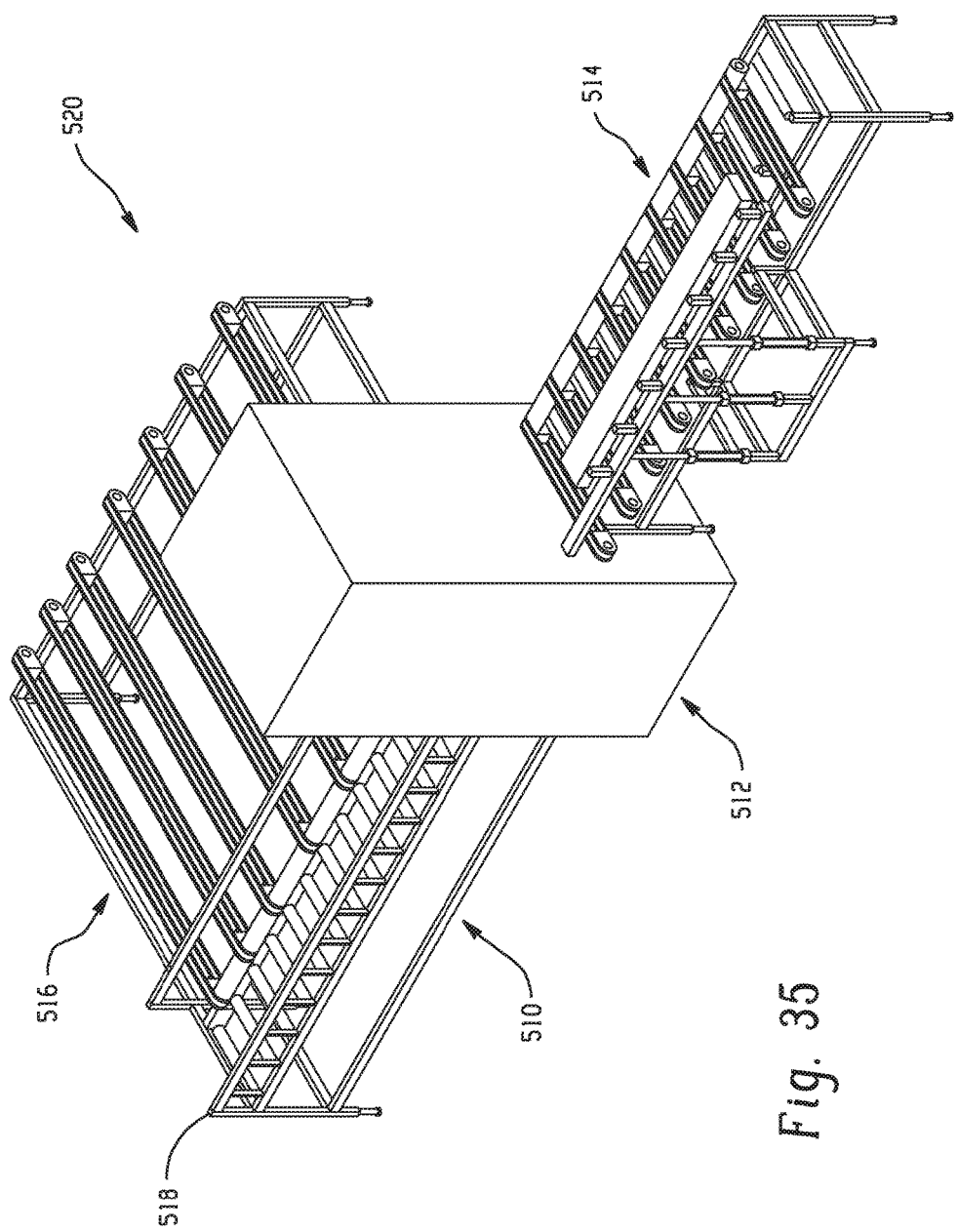
Figure 36:
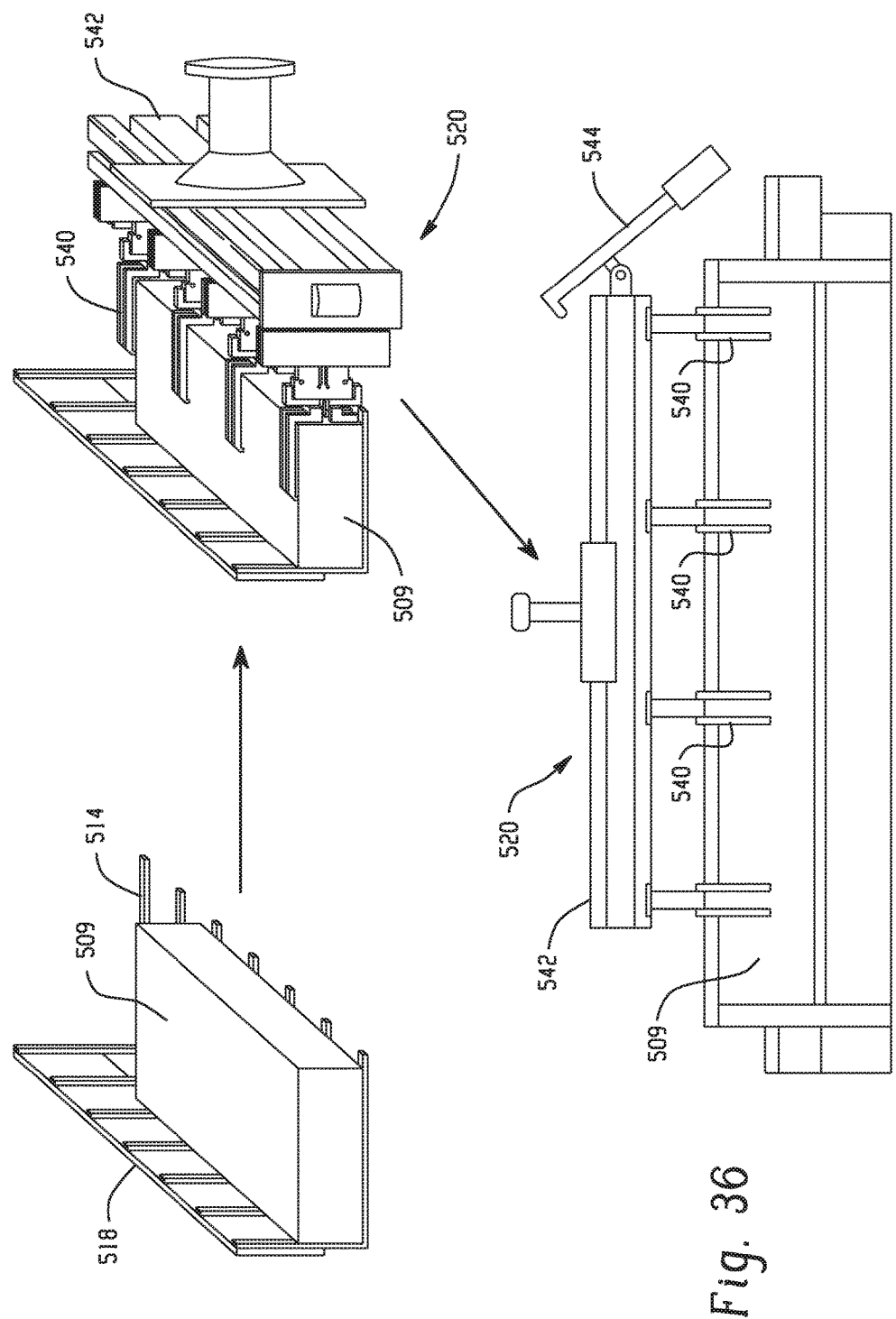

As shown more clearly in FIG. 35, the foam rail conveyor 502 includes an infeed conveyor 510, an adhesive applicator 512, and an output conveyor 514, wherein the input and output conveyors 510, 512 feed a foam rail 509 through the adhesive applicator 512, wherein a hot melt adhesive is automatically applied to selected surfaces thereof. A staging table 516 is proximate to the input conveyor and is configured to hold a plurality of foam side rails parallel to the input conveyor. The staging table 516 is further configured to periodically feed individual foam side rails onto the input conveyor 510. The input and output conveyors 510, 514 further include a railing 518 perpendicular to the conveying surface configured to align the railing through the feed path defined by the conveyors. The adhesive applicator 512 is similar to that described below albeit configured to spray adhesive along a length of a selected rail surface, which is then oriented using the robotic lifting assembly 506 to adhesively contact the foam layer when placed there on and at least one end so as to adhesively contact abutting side rails so as to form the bucket.

Referring back to FIG. 34, the robotic lifting assembly 506 generally includes a multi-axis functional robot 530, a movable arm 534, and a lifting assembly 532 attached to an end of the arm 534. The robot itself is not intended to be limited and is commercially available from numerous sources. An exemplary industrial robot is commercially available from ABB Ltd. As shown more clearly in FIG. 39, the lifting assembly 520 generally includes a plurality of adjustable u-shaped clamps 540 spaced apart along a length of a carrier 542, which is rotatably coupled to the robot arm 534. At one end of the carrier 542 is a pivotally adjustable member 544. During assembly of the bucket, the robotic lifting assembly is adapted to pick up a rail and place the rail onto a foam base layer using the u shaped clamps. The robotic lifting assembly moves in response to command signals to lift a foam rail having adhesive applied to the selected perimeter surface to the foam base layer. Member 544 is utilized to exert pressure against abutting side rails at the corners to insure adhesive contact.

Figure 37:
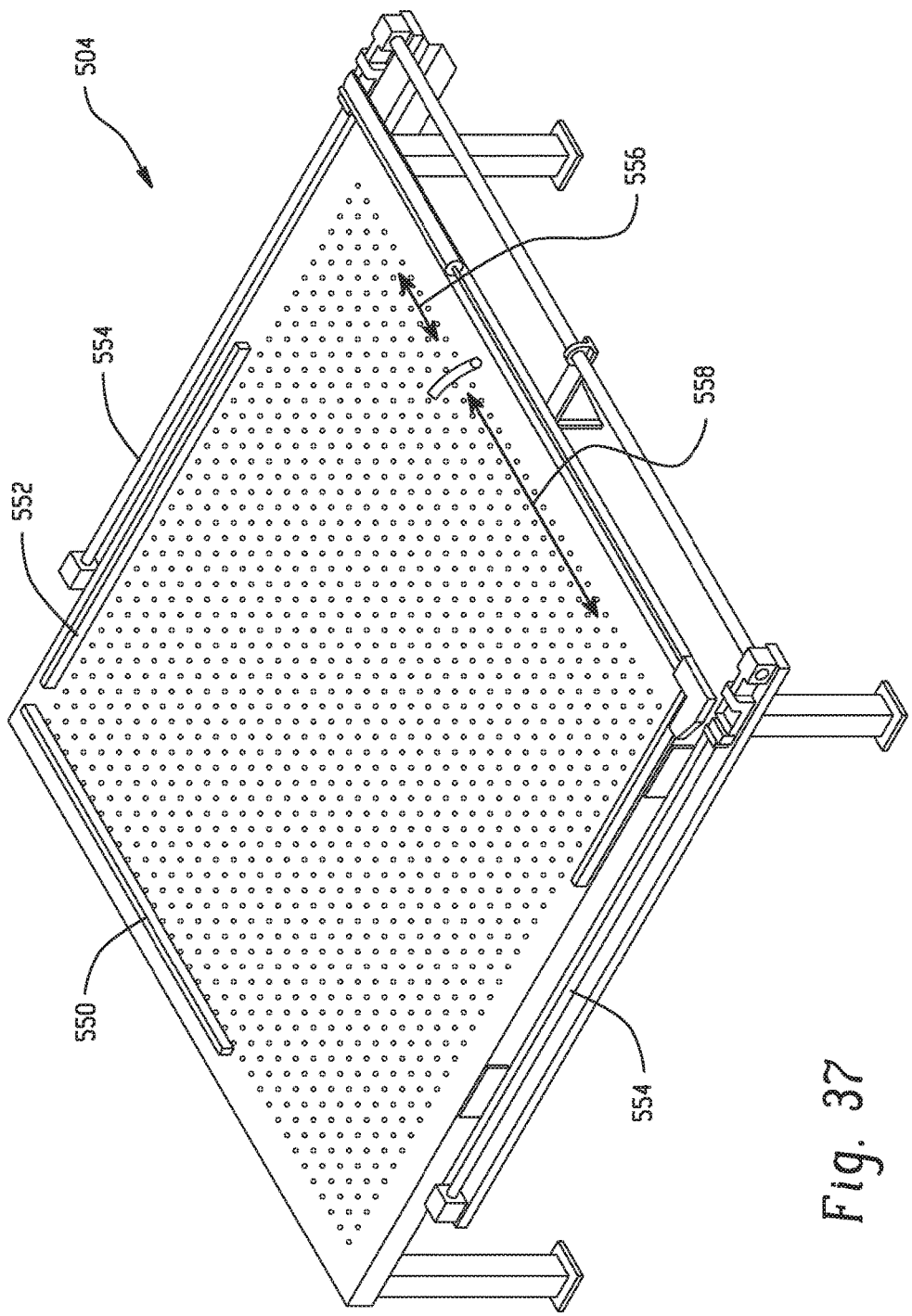

As shown in FIG. 37, the alignment table 504 includes member 556 pivotably attached to one end of the table and configured to grab and move a foam layer to a predetermined location. The member is generally L-shaped and can be adjusted as indicated by arrow 558 for the particular length or width of the foam layer. The alignment table includes stationary alignment rails 550, 552 perpendicular to one another and attached to the table to define a base datum corner, wherein the foam layer is positioned using member 556. The member 556, which is adjustable along one portion of the L shape is also movably coupled to adjustable rails 554 so as to seat the foam layer against alignment rails 550, 552. The table can further include a plurality of perforations in fluid communication with an air source configured to provide positive or negative air flow to maintain the position of the base foam layer during attachment of the side rails to form the bucket or facilitate removal.

Figure 17:
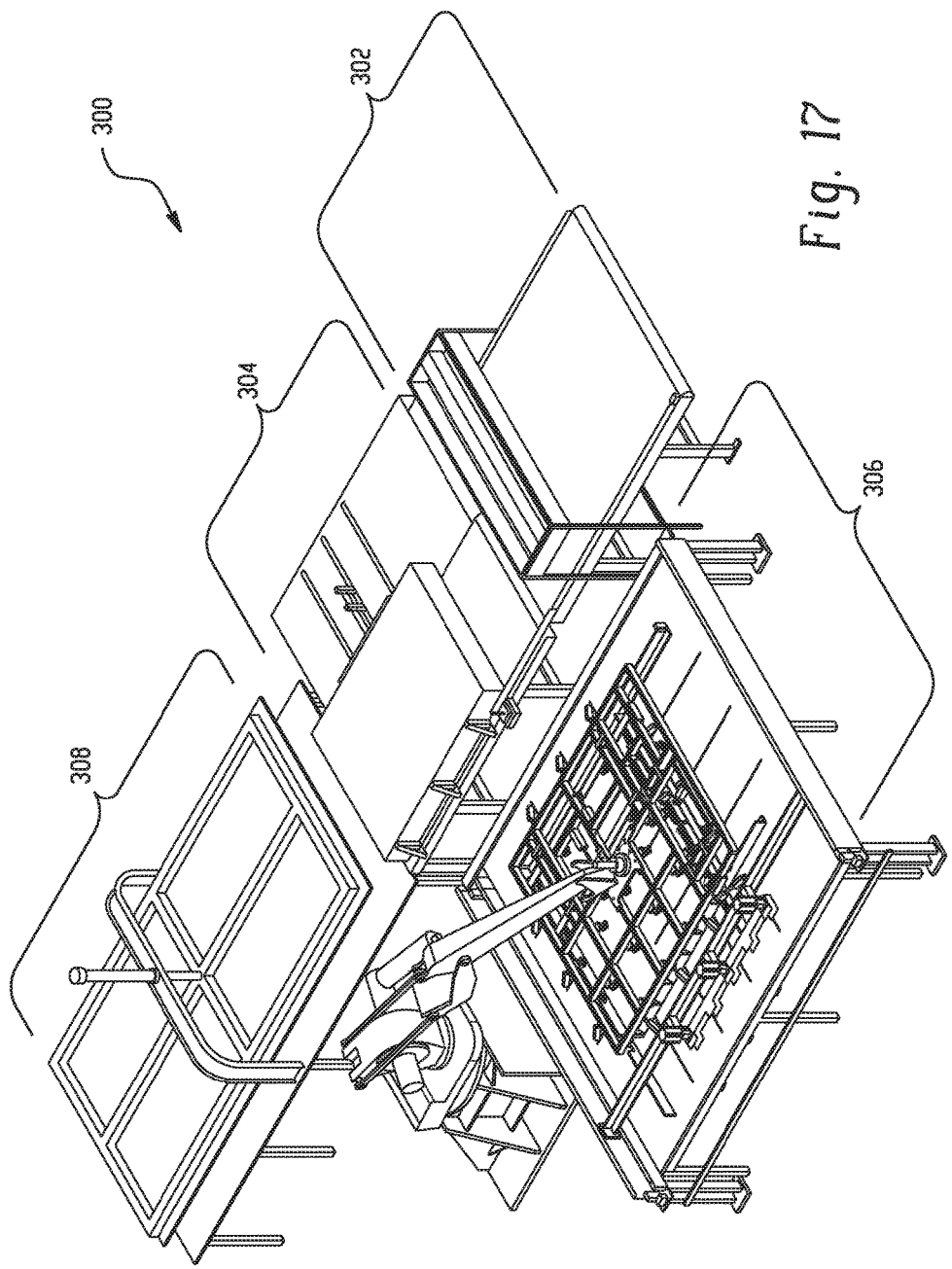
FIG. 17 depicts a perspective view of an automated apparatus for accurately securing one or more foam topper layers onto an innercore unit and bucket assembly in accordance with an embodiment of the present disclosure.

Turning now to FIG. 17, there is depicted an automated foam layer pick and placement apparatus for precisely placing foam layers onto the innercore and bucket assembly, which is generally designated by reference numeral 300. The automated foam layer pick and placement apparatus 300 includes an adhesive applicator station 302 for automatically applying controlled amounts of adhesive in a desired pattern onto a top surface of an assembled innercore unit and bucket assembly (or in the case where one foam layer has already been placed and adhesively secured, onto the top surface of the foam layer); an alignment station 304 for automatically aligning and accurately defining a position thereof; automated delivery/transfer of a foam layer from an automated guide vehicle to the sizing table (not shown), a foam layer sizing and robotic transfer station 306 for automatically delivering, locating, sizing, picking, and placing one or more foam layers onto the innercore unit and bucket assembly; and a compression station 308 for compressing the foam layer(s) onto the innercore unit and bucket assembly to provide consistent adhesion of the foam layer to the underlying top surface of the innercore unit and bucket assembly. The adhesive applicator station 302, the alignment station 304, and compression station 308 include conveyors that form the serially aligned conveyors between the different stations, e.g., 12, 14, 16, and the like.

As shown, the adhesive applicator station 302, innercore unit and bucket assembly alignment station 304, and the compression station 308 are serially aligned with one another as shown, wherein each station includes a movable surface (e.g., a conveyor rotatably driven by a motor) to define a travel path of the innercore unit and bucket assembly during alignment and as the foam layer(s) is placed thereon. However, it should be apparent that the apparatus 300 is not intended to be limited to the particular configuration as shown. Other variations and configurations will be apparent to those skilled in the art in view of this disclosure.

The movable surfaces of the stations, 302, 304, and 306 are generally coplanar to each other to permit transfer into and out of the respective stations as will be described in greater detail below. The tables supporting the various movable surfaces may also be interconnected to provide greater stability or may be fixedly attached to the ground. The foam layer sizing and robotic transfer station 306 is adjacent to the serially aligned adhesive applicator station 302, innercore unit and bucket assembly alignment station 304, and the compression station 306. In the embodiment as shown, the foam layer sizing and robotic transfer station 306 is immediately adjacent to the innercore unit and bucket assembly alignment station 304 to minimize the travel of the robot to effect placement of the foam layer from the sizing table onto the innercore unit and bucket assembly within the innercore unit and bucket assembly alignment station 306.

The apparatus and process is operably linked to a programmable logic control system (PLC system) or serial bus system and/or manufacturing execution solution (MES system) to plan and schedule the different process steps as well as minimize and/or eliminate manual labor, which represents a significant departure from prior art assembly processes. Each station is configured to communicate with the MES system, which are commercially available from a variety of suppliers, e.g., Preactor from Siemens AG. Designing the appropriate algorithms to perform the various steps to plan, schedule, operate, and control the system is well within the skill of those in the art. The data and inputs for operating the systems are generally available to an operator via a computer interactive display. The various actuators controlled by the system employed to automate the process are not intended to be limited to any particular type, e.g., pneumatic, hydraulic, electrical, and the like. Suitable actuators include servomotors, stepper motors, pneumatic actuators, hydraulic actuators, and the like.

Figure 18:
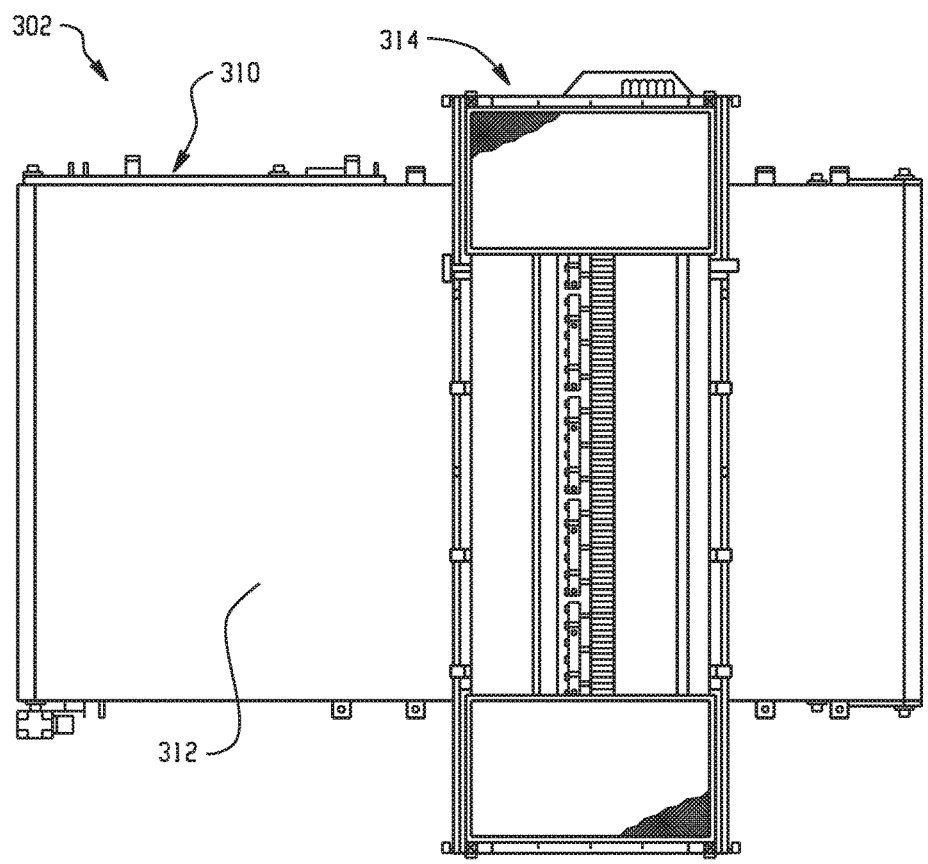
FIG. 18 depicts a perspective top down view of an adhesive applicator station utilized in the apparatus of FIG. 17.

Referring now to FIG. 18, there is shown a top down view of the adhesive applicator station 302, which includes a table 310 having a generally planar support surface 312 configured to support the innercore unit and bucket assembly during the process of applying adhesive to the innercore unit and bucket assembly. The support surface 312 can be elevated relative to ground and may include a movable support surface (i.e., a conveyor) for transferring the innercore unit and bucket assembly into and out of the station. The movable support surface is not intended to be limited to any particular type and may include a plurality of rollers and/or a rotatable belt rotatably driven by a motor for automatically moving the innercore unit and the bucket assembly into and/or out of the adhesive application station. Adjustment to the speed of the movable support surface allows for tailored feed rates to pair the adhesive application with placement of the foam layer or the like, thereby providing reproducible adhesive volume application in a desired pattern.

Figure 19:
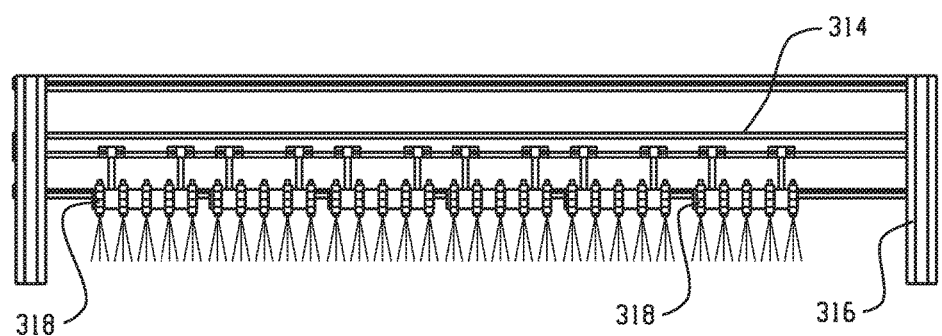
FIG. 19 depicts a side view of an exemplary glue bridge for the adhesive applicator station of FIG. 18.
Figure 20:
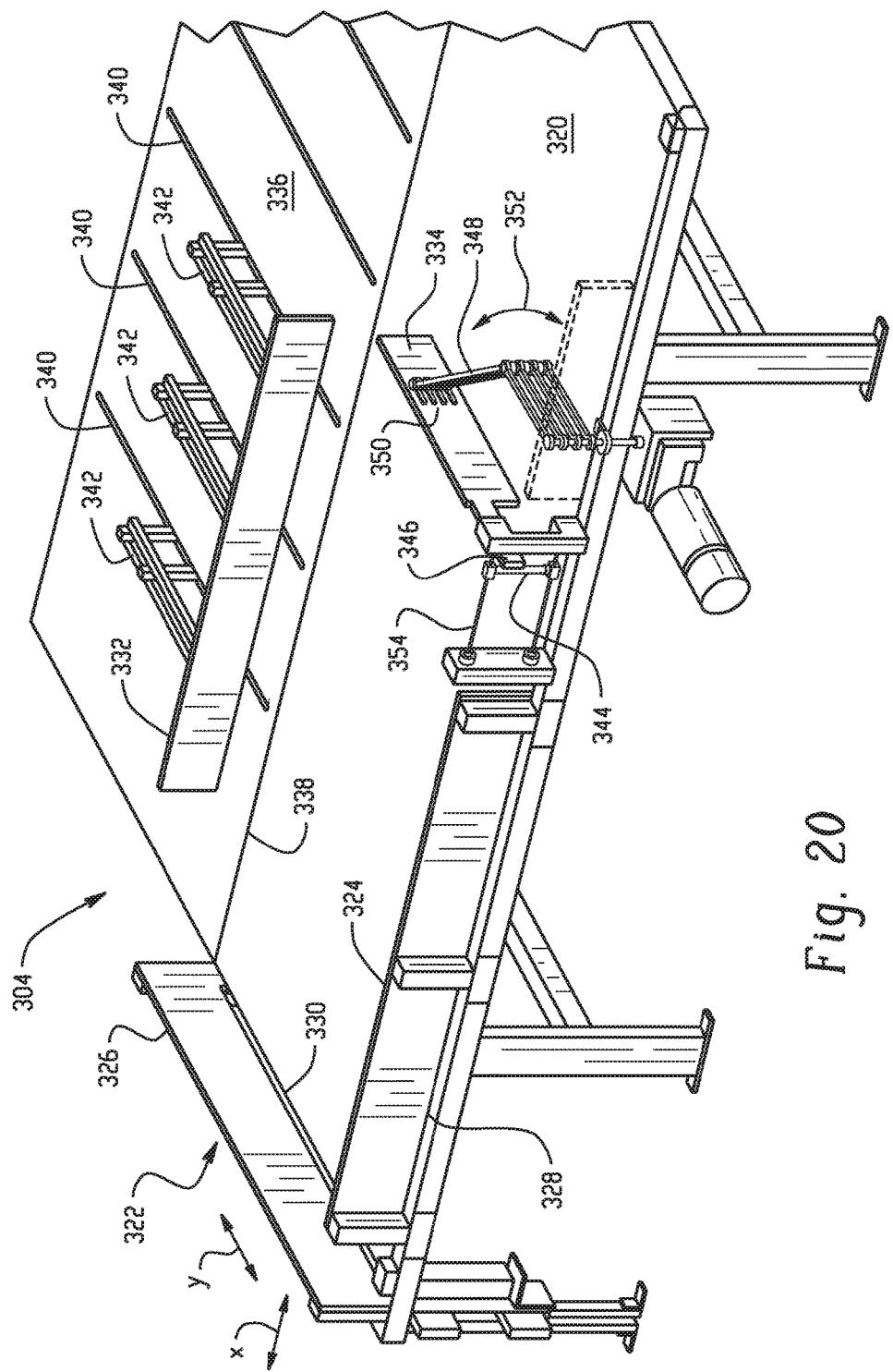
FIGS. 20-21 depict partial perspective views of an innercore unit and bucket assembly alignment station utilized in the apparatus of FIG. 17.
Figure 21:
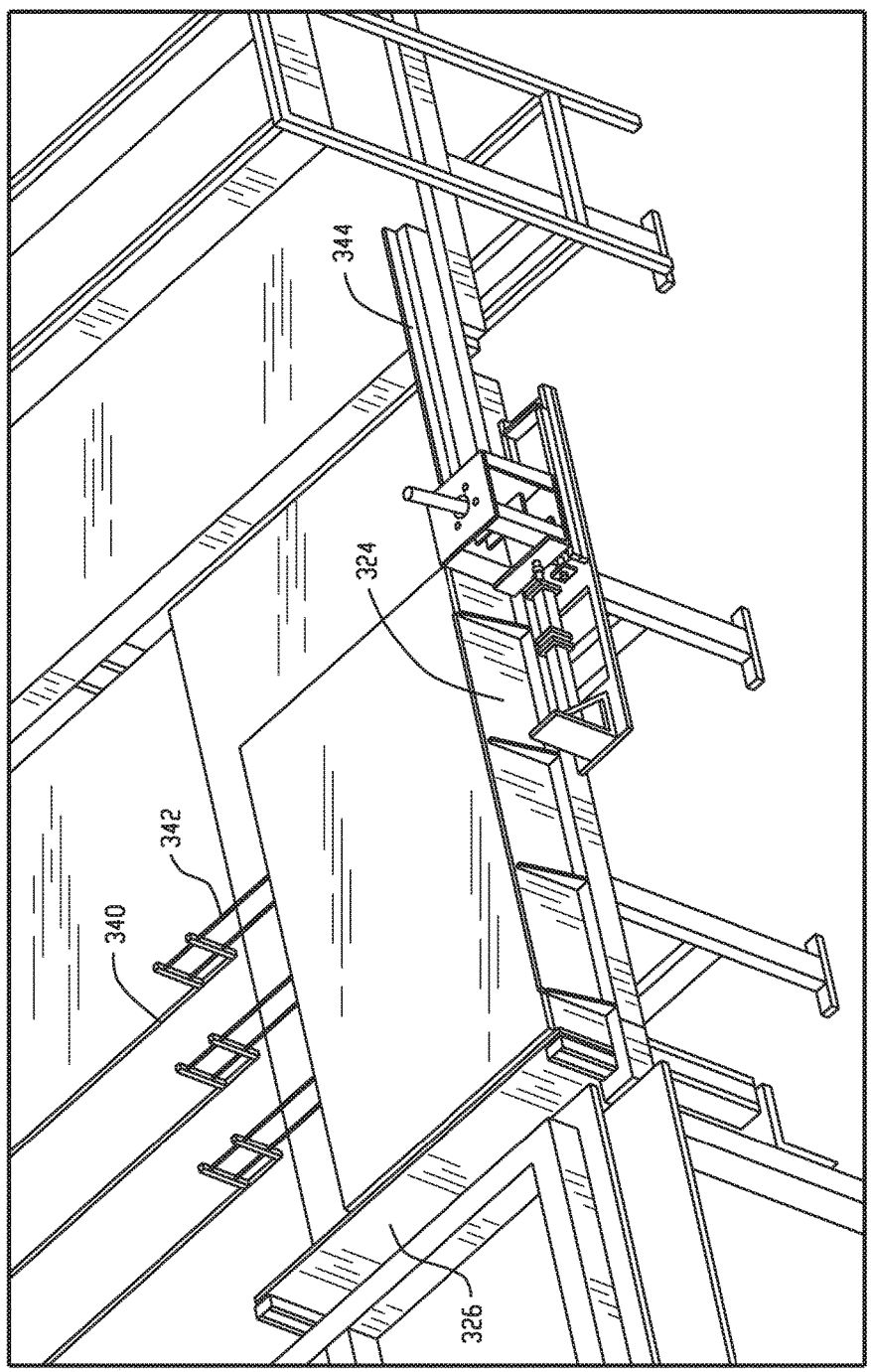

As shown more clearly in FIG. 19, the adhesive applicator station 302 further includes a bridge 304 carried by supports 316, wherein the bridge laterally spans across the length or width dimension of the support surface 312. Optionally, the bridge may be mounted directly to the underlying support surface 312. As shown, the bridge 316 generally spans a width dimension of the support surface, which during operation extends beyond a width dimension of the innercore unit and bucket assembly. The bridge is elevated relative to the support surface and positioned proximate to the innercore unit and bucket assembly alignment station 304, wherein the bridge is at a height from the support surface effective to permit clearance of the innercore unit and bucket assembly, with or without additional foam layers disposed thereon. In some embodiments, the bridge may be vertically movable, which is desired for the glue application to achieve consistent glue spray patterns. The bridge has coupled thereto one or more adhesive applicators 318, which may be statically or dynamically mounted to the bridge. The adhesive applicators are oriented to apply a desired pattern of adhesive to a top surface of an underlying innercore unit and bucket assembly (or foam layer if one is already placed and secured thereto). In this manner, adhesive may be applied to the top surface as the innercore unit and bucket assembly (or foam layer) as the assembly is conveyed into and from the adhesive applicator station.

The adhesive applicator(s) 318 is configured to provide a controlled amount of adhesive in a desired pattern to the top surfaces innercore unit and bucket assembly (or foam layer). In some embodiments, the adhesive applicator(s) may be moveable across the bridge so that application of the adhesive can be optimally located for each size and/or type of innercore unit and bucket assembly and/or foam layer as well as providing a desired pattern of the adhesive.

In the foregoing embodiments, the application of the adhesive may be intermittent or continuous. Similarly, the adhesive may be applied to the entire top surface or to selected portions thereof as may be desired in some applications. In one embodiment, the adhesive applicator includes a plurality of nozzles in fluid communication with a source of adhesive such as a hot melt adhesive. The adhesive applicator may be coupled to a motion detector system or sensor system (not shown) for actuating the nozzles as the innercore unit and bucket assembly is transferred into and/or out of the adhesive application station 302. Adhesive application can be triggered by the product presence sensors in conjunction with PLC logic code to ensure exact start and stop of adhesive application for the particular mattress size. The PLC/MES system may be programed to adjust the adhesive application based on the type of foam topper (density and ILD) and foam layer sequence (e.g., third foam layer on the inner core unit and bucket assembly which is close to the mattress surface assumes incremental movement and can require a different glue pattern compare to other stackedly arranged foam layers, e.g., additional foam layers and/or the first foam layer disposed on the innercore unit and bucket assembly). In one embodiment, the adhesive applicator 318 is a dual pump spray system that provides a metered volume and the nozzles therein are configured to provide a desired pattern of an adhesive through the use of the programmable logic control device and/or glue spray pattern code/logic. For example, actuation of the adhesive applicator can be configured to occur upon detection by the motion detector system of the leading edge of the innercore unit and bucket assembly traveling underneath the adhesive applicator and discontinued upon detection of the trailing edge of the bucket. The automation provided by the adhesive applicator(s) provides controlled adhesive application and patterning, thereby allowing for significantly more consistent and repeatable application of the adhesive as compared to prior art processes. Moreover, by providing a specific pattern and volume of adhesive, significant cost savings can be realized relative to the prior art manual spray application of the adhesive by an operator.

The innercore unit and bucket assembly alignment station 304 shown in FIGS. 20-30 includes a support surface 320 for supporting the innercore unit and bucket assembly during alignment as well as during foam layer placement. The support surface 320 may include a movable support surface for transferring the innercore unit and bucket assembly into and out of the station. The movable support surface is not intended to be limited to any particular type and may include a plurality of rollers and/or a rotatable belt rotatably driven by a motor for automatically moving the innercore unit and the bucket assembly into and/or out of the adhesive application station.

The alignment station 304 further includes an adjustable rail assembly 322 for aligning the innercore unit and bucket assembly to a precise reproducible location. The rail assembly generally includes two reference rails 324, 326 that collectively define a base datum corner of the innercore unit and bucket assembly when seated against these rails. Reference rail 324 extends along a side of the support surface 320 (i.e., the x-direction and is generally parallel to the travel path of the innercore unit and bucket assembly) and reference rail 326 is transverse to the support surface 320 and is positioned at the edge of the support surface 320 (i.e., the y-direction and is generally perpendicular to the travel path of the innercore and bucket assembly). Reference rail 326 may be fixedly mounted to the side 328 of the support surface 320. Reference rail 326 is disposed at support surface end 330 generally perpendicular to the travel path of the innercore unit and bucket assembly. Both rails 324, 326 may be vertically retractable with respect to ground via an actuator controlled by the PLC system. During the alignment process, reference rail 326 is in the raised position as shown and during transfer from one station to another, the rail may be retracted so as to permit the innercore unit and bucket assembly to travel unimpeded along the travel path.

The adjustable rail assembly further includes movable rails 332 and 334, wherein the rails 324, 326, 332, and 334, collectively frame the innercore unit and bucket assembly during the alignment process with movable rails 332 and 334 pushing the innercore unit and bucket assembly against the reference rails, thereby establishing a base datum reference indicative of the exact position and orientation of the innercore unit and bucket assembly. Movable rail 332 is positioned parallel to the travel path of the innercore unit and bucket assembly and is configured to move in the y-direction so as to compress against a sidewall of the innercore unit and bucket assembly when in use and movable rail 334 is configured to push against a sidewall of the innercore unit and bucket assembly in the x-direction. Each of the rails 324, 326, 332, and 334 includes a planar surface perpendicular to the support surface. In this manner, during alignment the movable rails 332, 334 serve to push the innercore unit and bucket assembly against reference rails 324, 326 such that a corner of the innercore unit and bucket assembly is seated against reference rails 324, 326 at a precise, reproducible location and orientation.

Movable rail 332 is movably disposed on a support surface 336 that is adjacent and coplanar to end 338 of the support surface 320. Support surface 336 includes one or more track guides 340 that are generally perpendicular to the travel path of the innercore unit and bucket assembly. An arm 342 is attached at one end to a back side of the rail 332 and at the other end movably coupled to the track guide. The particular numbers of arms attached to the rail 332, three of which are shown, are not intended to be limited. At least one arm is operably linked to rail 332. Likewise, the number of track guides is not intended to be limited and will generally correspond to the number of arms. An actuator controlled by the PLC system is operably linked to the arm to selectively move rail 332 along the track guide 340.

Movable rail 334 is attached to a hinge 344 at one end 346 and to a retractable arm 348 at about the other end 350. The retractable arm 348 provides rotation about an axis of the hinge 344 such that when in use the rail 334 is positioned to be parallel to a sidewall of the innercore unit and bucket assembly and when not in use the rail is retracted away from the sidewall. As shown, retraction of the arm 348 in the direction shown by arrow 352 swings the rail 334 out of the travel path of the innercore unit and bucket assembly. The hinge 344 (and rail 334) is movably coupled to guide rails 354 to effect linear movement of the rail along the travel path if the innercore unit and bucket assembly. When the arm is extended, travel of the rail 334 along the guide rails 354 permits the rail 334 to push against a sidewall of the innercore unit and bucket assembly. Optionally, the movable rail may further include a stop (not shown) for receiving the rail when retracted. The stop may be magnetic and may include a recess for receiving the rail. One or more actuators, e.g., servomotors, two of which are shown, are operably linked to the rail 334 to provide extension and retraction of rail as well as to movement of the rail along the guide rails.

Figure 22:
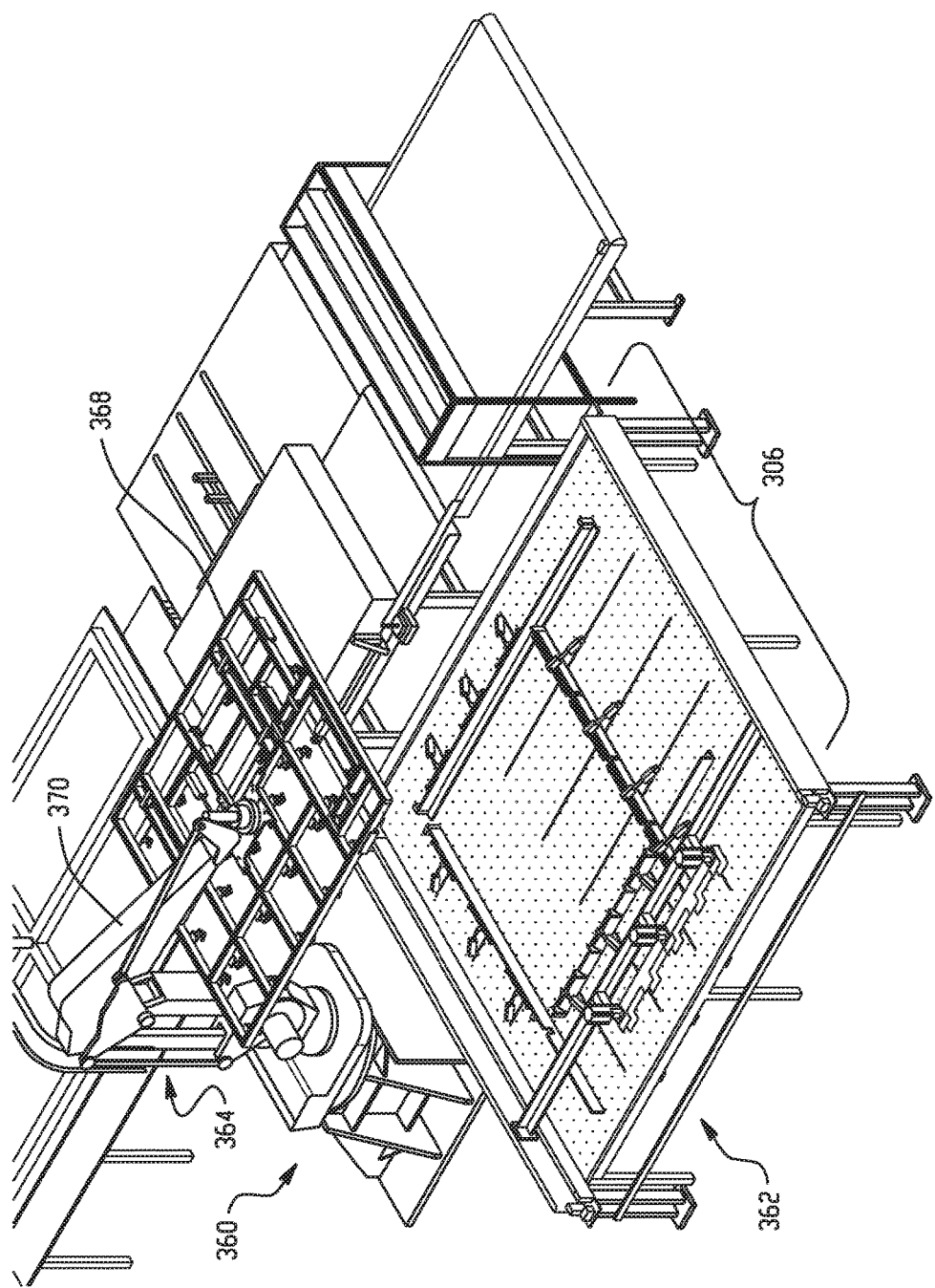
FIG. 22 depicts a perspective view of a foam layer sizing and robotic transfer station utilized in the apparatus of FIG. 17.

Turning now to FIG. 22, there is shown the foam layer sizing and robotic transfer station 306, which generally includes a robotic lifting assembly 360 and a foam layer sizing table 362. The robotic lifting assembly 360 moves in response to command signals to lift a nominally sized foam layer from the sizing table 362 and precisely place the foam layer onto the innercore unit and bucket assembly. The robotic lifting assembly 360 generally includes a multi-axis functional robot 364 and a lifting assembly 368 attached to an arm 370 of the multi-axis functional robot. The robot itself is not intended to be limited and is commercially available from numerous sources. An exemplary industrial robot for picking and placing the foam layer is commercially available from ABB Ltd.

Figure 23:
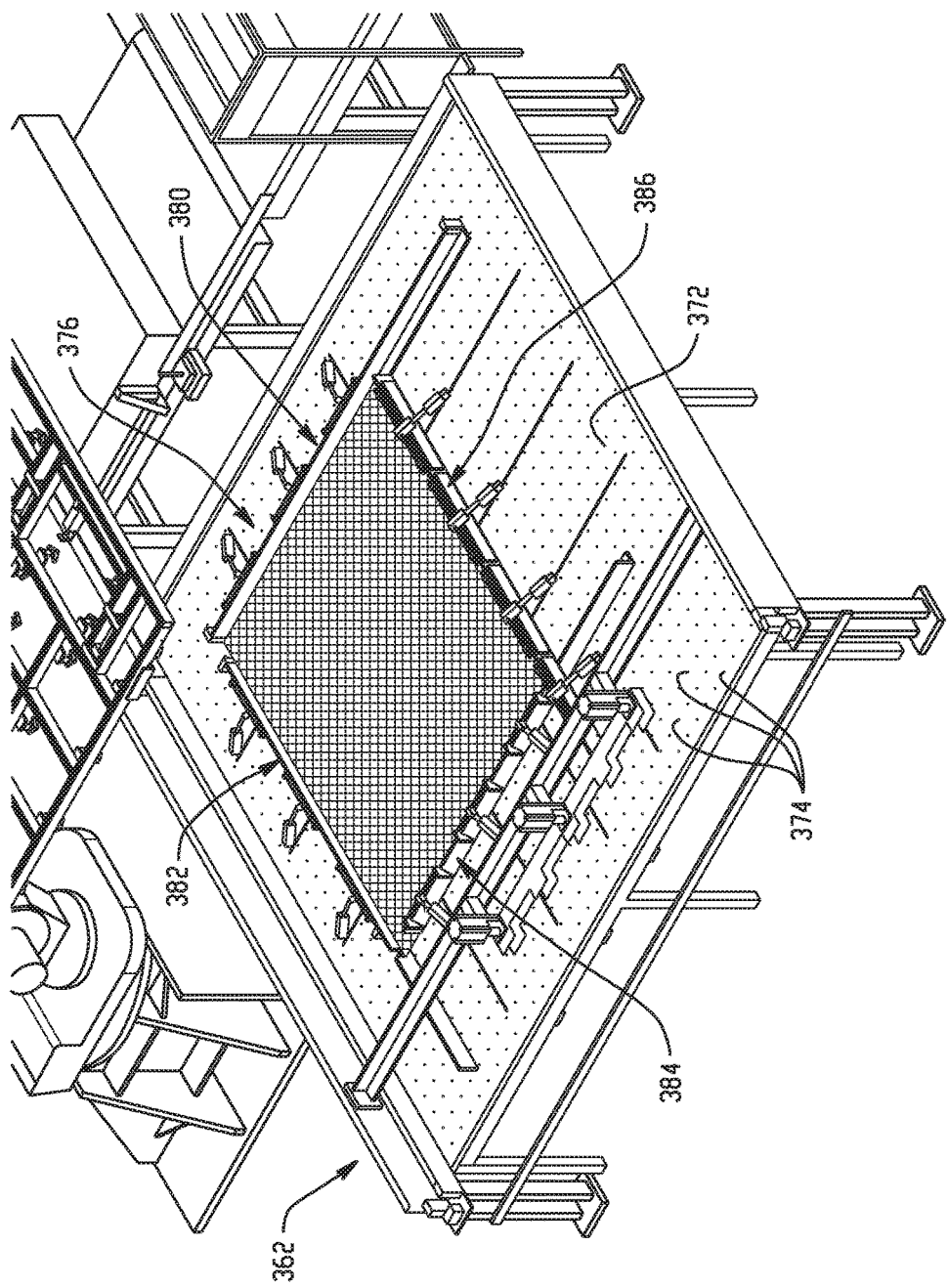
FIG. 23 depicts a perspective view of an exemplary sizing table utilized in the foam layer sizing and robotic transfer station of FIG. 17.
Figure 24:
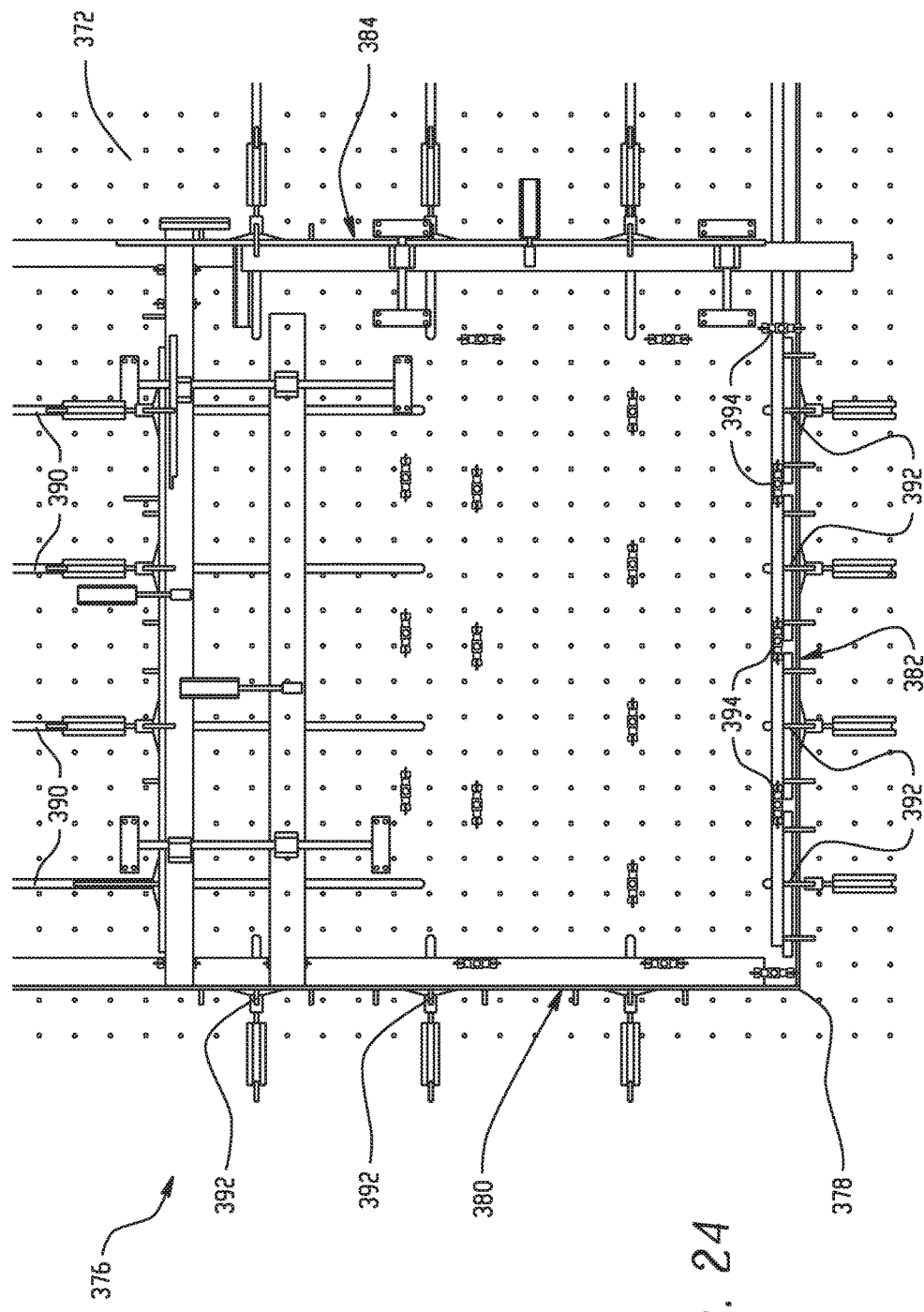
FIG. 24 provides a top down view of the exemplary sizing table with positioning of the lifting units utilized in the foam layer sizing and robotic transfer station of FIG. 17.

As shown in FIGS. 23-24, the sizing table 362 includes a generally planar surface 372 for supporting the foam layer during the sizing process. The planar surface 372 may include a plurality of perforations 374 extending through the surface. The sizing table 362 further includes an adjustable rail assembly 376 shown more clearly in FIG. 24 for sizing the foam layer to a nominal size and providing a precise reproducible location to the apparatus. As used herein, the term nominal size is to be accorded its usual and customary meaning. In general, nominal size refers to a standardized dimension specific to the intended mattress dimension, e.g., twin, queen and the like. The nominally sized foam layer will generally be sized to match the length and width dimensions of the innercore unit and bucket assembly (or foam layer disposed thereon) to which the nominally sized foam layer is to be attached. The adjustable rail assembly 376 is configured to frame the foam layer as shown in FIG. 23 and automatically compress the foam layer to less than nominal size followed by stretching of the foam layer to the nominal size defined by the programmed specification for the particular foam layer, which is then lifted and subsequently placed on the innercore unit and bucket assembly via the robotic lifting assembly 360. As will be discussed in greater detail below, the adjustable rail assembly 376 provides a base datum corner 378 for the foam layer, which is then matched with the base datum corner of the aligned innercore unit and bucket assembly to provide precise placement and orientation of the foam layer onto the innercore unit and bucket assembly.

The adjustable rail assembly 376 generally includes two reference rails 258, 260 adjustably positioned on the sizing table 362 that generally intersect at one end at a right angle on the table at a known location so as to collectively define the base datum corner 378 for the foam layer when seated against these rails. Reference rail generally 380 generally corresponds to a width dimension of the foam layer and reference rail 382 generally corresponds to a length dimension of the foam layer.

The adjustable rail assembly further includes movable rails 384 and 386, wherein the rails 380, 382, 384, and 386 collectively frame the foam layer during the sizing process with the movable rails 384 and 386 aligning the foam layer, which is then compressed by the rails 380, 382, 384, and 386. The rails may be of unitary construction or may comprise segments of equal or differing lengths, wherein each segment may be independently controlled by an actuator, e.g., a pneumatic actuator.

Movable rail 384 is positioned parallel to reference rail 380 and movable rail 386 is positioned parallel to reference rail 382 so as to define the adjustable rail assembly 376. Each of the rails 380, 382, 384, and 386 includes a planar surface perpendicular to surface 372. In this manner, during sizing the rails 380, 382, 384, 386 serve to compress the foam layer against the respective opposing rail.

The surface 372 further includes one or more track guides 390 that are generally perpendicular to rails 380, 382, 384, and 386. The rails are operably coupled to the track guides 390 via an arm 392 attached at one end to a back side of the rails and at the other end movably coupled to the track guide. The particular numbers of arms attached to the rails are not intended to be limited. At least one arm is operably linked to the rail. Likewise, the number of track guides is not intended to be limited and will generally correspond to the number of arms. An actuator such as a servomotor controlled by the PLC system is operably linked to the arms to selectively and precisely move the rails along the corresponding track guide 390. Movable rails 384 and 386 include longer track guides to accommodate different size foam layers whereas rails 380 and 382 include shorter track guides to provide compression of the foam layer during the sizing process.

Each of the rails 380, 382, 384, and 386 further includes a gripper assembly for clamping onto the foam layer during the stretching step of the sizing process. As noted above, the foam layer is first compressed against the rails to less than nominal size. During the stretching step, the gripper assemblies disposed on the rails 380, 382, 384, 386 are actuated to clamp downward onto the foam layer and rails 384, 386 are then moved to a predefined position. The movement of rails 384, 386 to the predefined position stretches the foam layer to its nominal size as defined by the foam layer specification. The gripper assemblies 394 are generally pivotably coupled to and spaced about the rails to provide controlled gripping of the foam at the edge and stretching.

Figure 25:
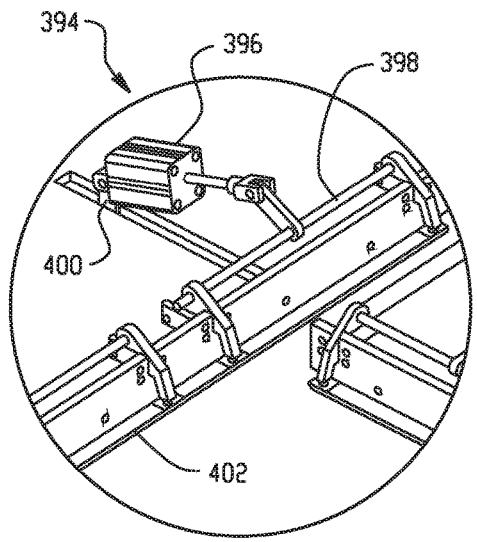
FIGS. 25-26 illustrate front and rear facing perspective views of a gripper assembly for use in compressing and stretching a foam layer in the foam layer sizing and robotic transfer station in accordance with an embodiment of the present disclosure.
Figure 26:
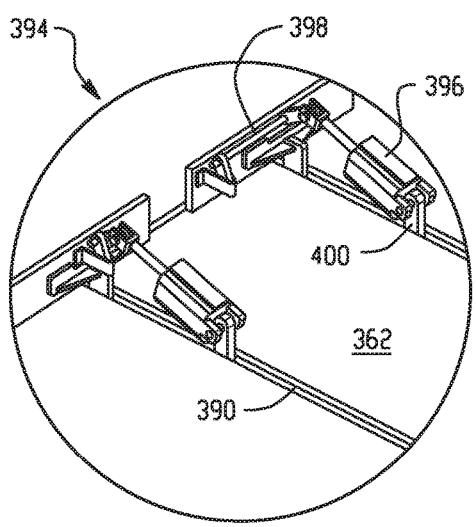
Figure 27:
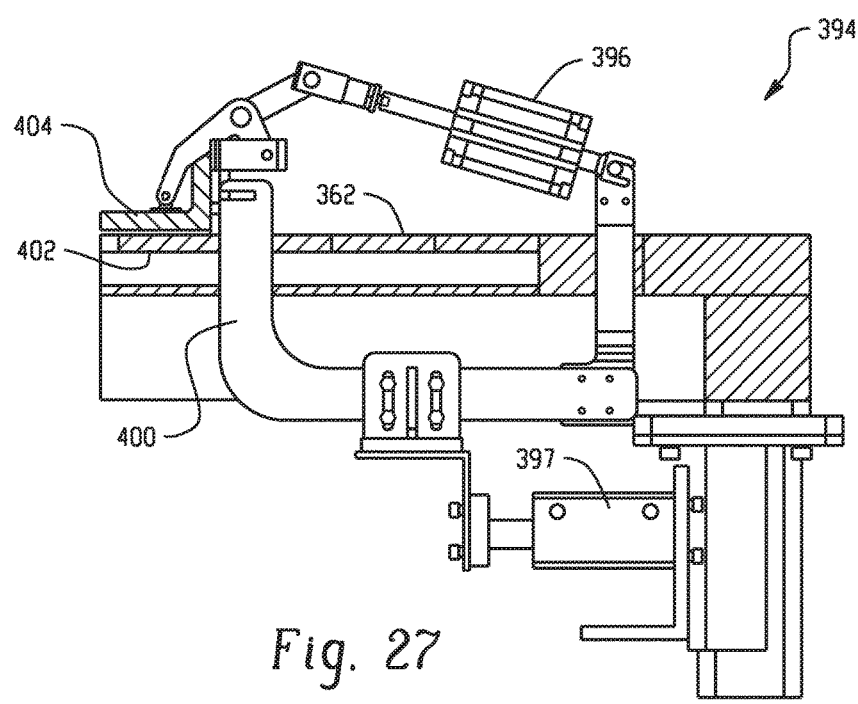
FIG. 27 illustrates a sectional view of the gripper assembly of FIGS. 25-26.
Figure 28:
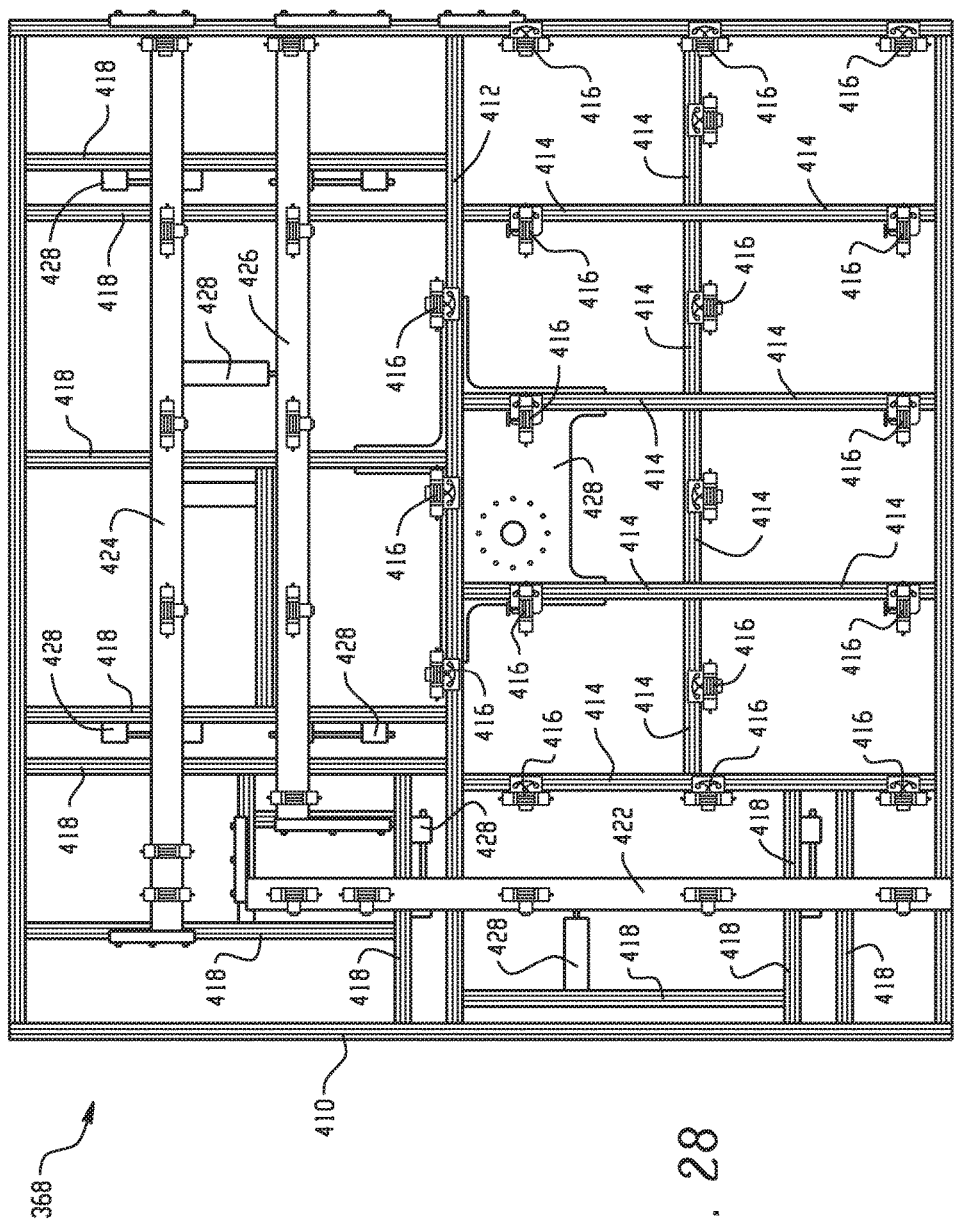
FIG. 28 provides a top down view of the lifting assembly for use in the foam layer sizing and robotic transfer station in accordance with an embodiment of the present disclosure.

The particular gripper assemblies 394 are not intended to be limited. An exemplary gripper assembly is shown in FIGS. 25-27, wherein the gripper assembly 394 generally includes an actuator 396, e.g., a linear actuator or the like, that is coupled at one end to bar 398 and at the other end to a second actuator 397 disposed underneath the table 362 via a link 400 engaged within track guide 390. Actuation of the second actuator 397 effects precision movement of the rail e.g., rail 380, across the surface 372 of the sizing table 362. The bar 398 is pivotably coupled to the rail and attached to a pivotably movable upper plate 404. The rail further includes a lower plate 402 upon which an outer periphery of the foam layer is generally disposed on after the foam layer is placed on the sizing table and compressed. Actuation of the actuator 396 pivotably lowers the movable upper plate 404 so as to sandwich the outer periphery of the foam layer between the movable upper plate 404 and the lower plate 402. Subsequent movement of the second actuator outwardly from the foam layer causes the rails to stretch the foam layer. Movement across the table is carefully controlled so that the foam layer is stretched to its nominal size.

In one embodiment, sensors may be located on the rails to assist in aligning the gripper assemblies to the edges of the foam layer. Servomotors may be employed to move the rails to the programmed position, e.g., moves the rails including the gripper assemblies to contact foam layer As shown more clearly in FIG. 28, the lifting assembly 368 includes a frame 410 with a primary beam 412 bisecting the frame 410 at about a midpoint. Secondary beams 414 are coupled to the primary beam 412 and/or the frame 410 to define a rectangularly shaped portion of the lifting assembly having attached thereto statically positioned lifting units 416 in a spaced arrangement about the rectangularly shaped portion, wherein the rectangularly shaped portion overlays a major portion of an underlying foam layer. The lifting assembly 368 further includes support beams 418 for supporting movable beams 422, 424, and 426 mounted thereto. Each movable beam 422, 424, and 426 includes additional lifting units 216 spacedly arranged on the beams. In some embodiments, the position of the lifting units 216 may be adjustable on the rail. The position of these movable beams 422, 424, and 426 can be selected and optimized based on the dimensions of the foam layer to be lifted corresponding to the mattress size. For example, movable beam 422 can be selectively moved to accommodate the manufacture of mattresses having various lengths e.g., standard, long, extra-long, etc. whereas movable beams 424 and 426 can be selectively moved to accommodate the manufacture of mattresses having various widths, e.g., twin, full, queen, king, etc. The movable beams are generally positioned to overlay an edge of the underlying foam layer that is outside the area overlayed by the statically positioned rectangular shaped portion discussed above. The position of the movable beams can be programmed in the PLC system. Precise movement of the rails can be provided by precision ball bearing slides or the like. An attachment plate 428 is centrally located on the frame and provides the means for attaching the arm to the lifting assembly.

Figure 29:
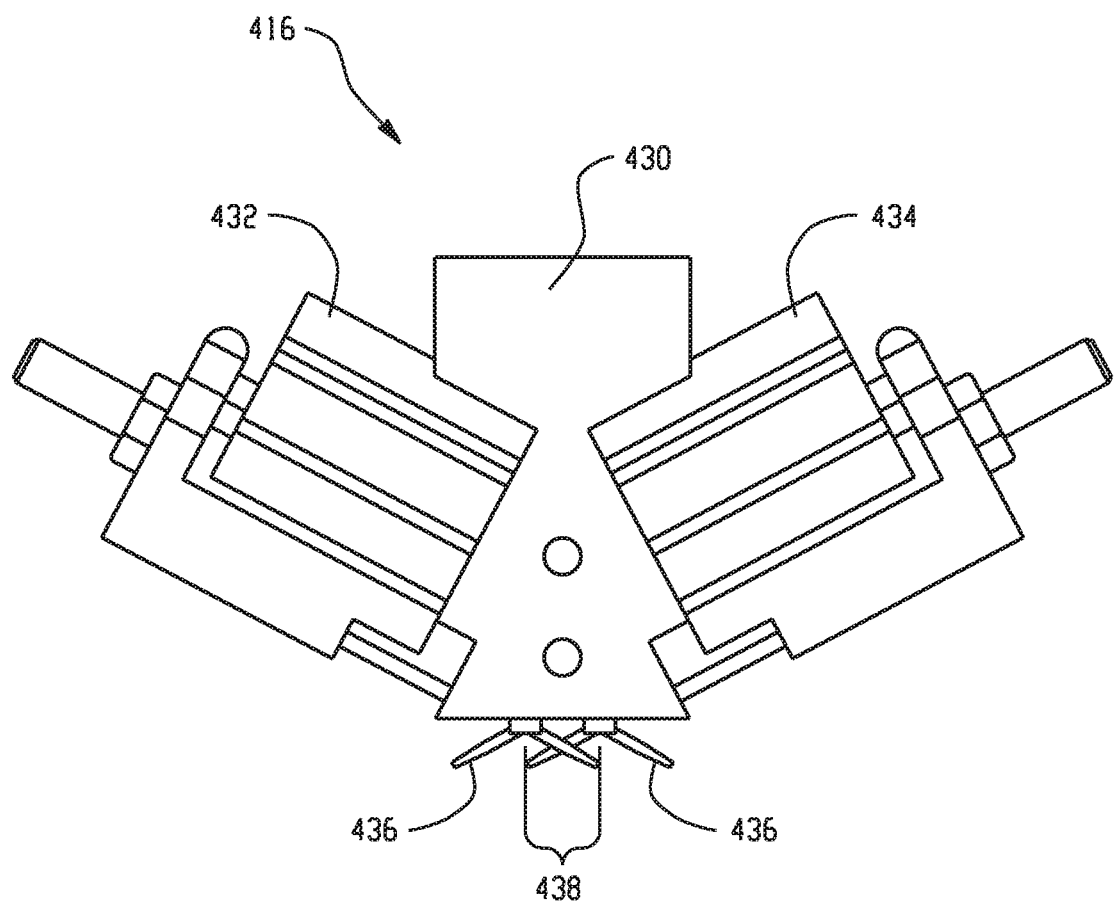
FIG. 29 depicts an exemplary lifting unit for use in the lifting assembly in accordance with the present disclosure.

As shown more clearly in FIG. 29, each one of the lifting units 416 generally includes a head 430 that supports two slides 432, 434, each of which is provided with one or more retractable angled needles 436 (shown extended from the head). The needles on one slide face towards the needles of the other slide, sloping one towards the others. The needles are at an angle relative to a foam layer of about 30 (150) to about 60 (120) degrees in most embodiments, although angles greater or less than this range can be used. In one embodiment, the needles are at an angle of 45 (135) degrees. Moreover, the needles from the respective slides are spaced by a gap 438 such that the needles from the opposing slides overlap when extended into the foam layer.

Both of the slides, and with them the needles that are fixed to them, are controlled and movable in opposite directions between an idle position, in which the needles on one slide are retracted and are at a distance from those on the other slide, and an active position, in which the needles of the two slides move forward, cross each other and sloping penetrate into the element to be picked up and, with the help of a flat head, they are able to gather it and transfer it according to requirements. An exemplary needle gripper is commercially available from Schmalz Inc. Exemplary needle grippers are disclosed in U.S. Pat. No. 8,104,807, incorporated herein by reference in its entirety and are commercially available from Schmalz, Inc.

Figure 30:
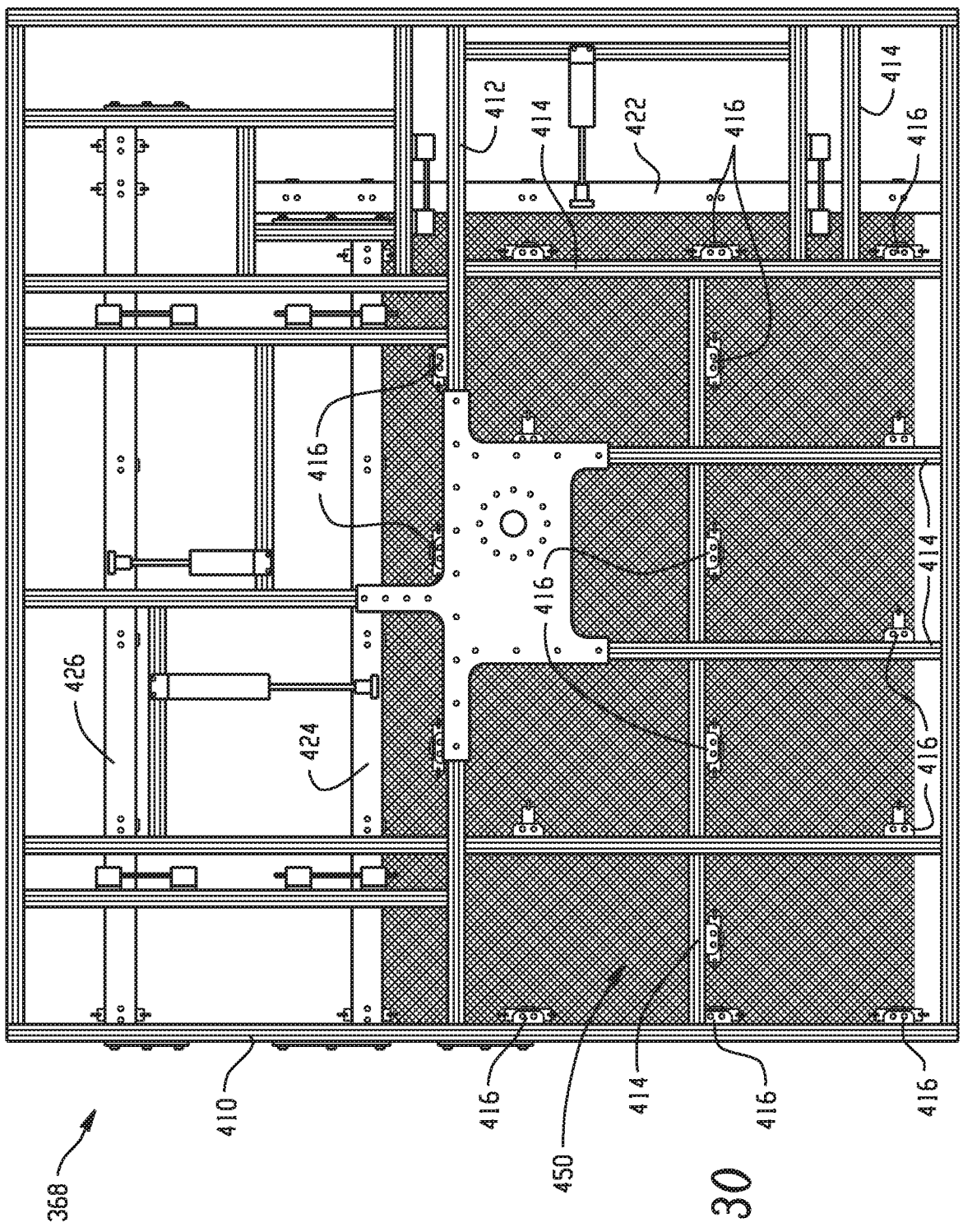
FIG. 30 depicts the lifting assembly positioned to lift a foam layer from the sizing table of FIG. 18.

FIG. 30 depicts the lifting assembly 368 positioned to lift an exemplary underlying foam layer 450 that has previously been compressed and stretched to a nominal size. The movable beams 422 and 424 are optimally positioned such that lift units 416 are at positions disposed over a peripheral edge of the foam layer as well as spacedly and uniformly arranged over an interior region of the foam layer so as to lift the foam layer and maintain its nominal size. In the embodiment shown, movable beam 426 is not needed to lift this particular sized foam layer and is positioned such that the lifting units disposed thereon do not overlay the foam layer.

During operation, the sizing table 362 (FIG. 23) first receives a foam layer, e.g., 450 from a delivery system, e.g., manually placed by an operator or through an automated guide vehicle or robotic assist via grippers, or the like. The movable rail sections on the sizing table 362 are activated to match the size of the foam layer being sized. The actuators, e.g., servomotors, are configured and programmed to move the rails until it contacts the foam layer. The adjustable rail assembly 376 holds the foam as it is transported to the base corner datum. The gripping assemblies 394 are then activated and the foam layer is stretched to its nominal size, which matches the length and width dimensions of the innercore unit and bucket assembly. The lifting assembly 368 is then robotically lowered onto the foam layer and the lifting units incorporating needles are activated to engage the foam layer. The foam layer at its nominal size is then placed onto the innercore unit and bucket assembly using the base corner datum as a reference point to provide precise placement of the foam layer.

Advantageously, the sizing function may incorporate variable compression forces, variable stretching forces, and clamping based on the foam type with real time adjustments to achieve the intended functional value desired. Consequently, sizing of the foam layer will reduce process variability by providing consistency in terms of the size and precise placement of the foam layer onto the previously aligned and known position of the innercore unit and bucket assembly.

Figure 31:
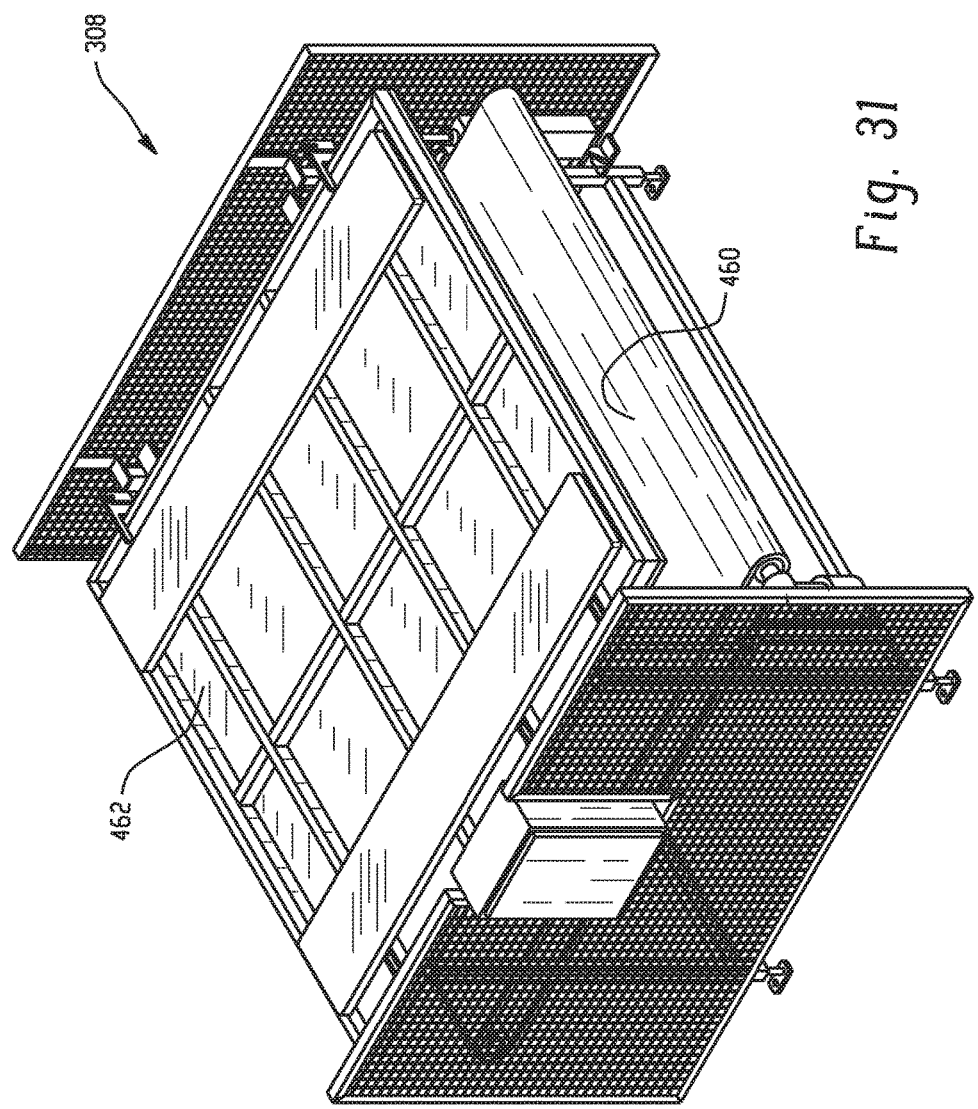
FIGS. 31-32 depict a perspective view and an end on view, respectively, of a compression station utilized in the apparatus of FIG. 17.
Figure 32:
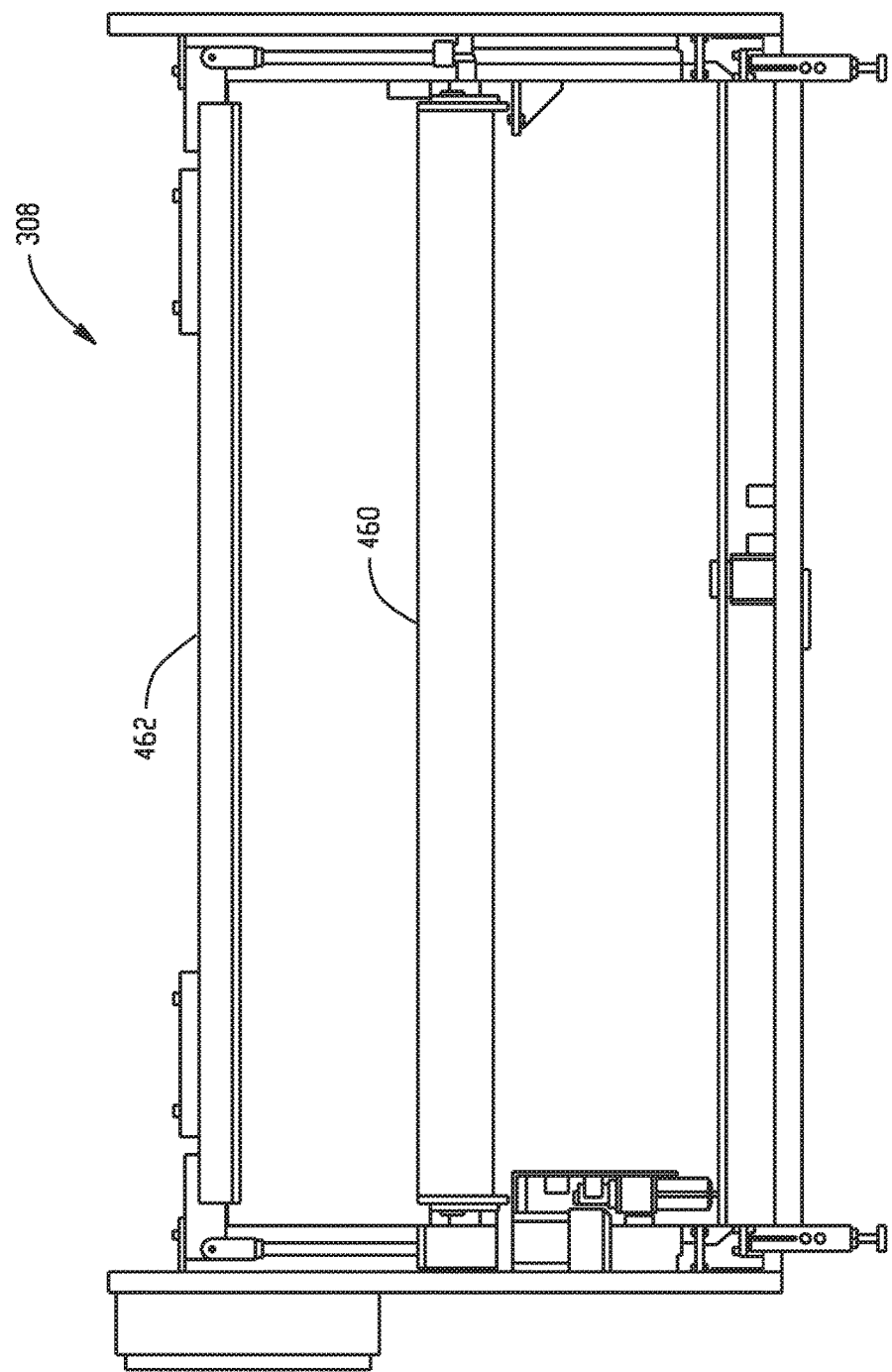

As shown in FIGS. 31-32, the compression station 308 generally includes a support surface 460 coplanar and serially connected to the support surface of the alignment station 304. The support surface 460 may include a movable support surface for transferring the innercore unit and bucket assembly with the foam layer(s) thereon into and out of the station. The movable support surface is not intended to be limited to any particular type and may include a plurality of rollers and/or a rotatable belt rotatably driven by a motor for automatically moving the innercore unit and the bucket assembly into and/or out of the adhesive application station.

The compression station 308 further includes a vertically movable platen 462 disposed above the support surface. The platen 462 may be driven by actuators (not shown), e.g., pneumatic actuators, hydraulic actuators, or the like that move the platen vertically upward and downward such that when the innercore unit and bucket assembly having the foam layers disposed therein are transferred to the compression station, the platen is lowered to compress the assembly. The compression of the assembly provides a predetermined and programmed pressure on the assembly to provide consistent and uniform downward pressure across the surface of uppermost foam layer, which serves to maximize contact of the adhesive between the various layers, thereby minimizing the amount of adhesive used compared to the prior art as well as providing reproducibility with regard to adhesive strength.

The platen 462 has a substantially planar surface that contacts the surface of the uppermost foam layer. The platen is generally dimensioned such that the substantially planar surface can be configured to provide a constant pressure across the entire surface of whatever size foam layer the platen contacts. As such, the platen is generally dimensioned to be larger than the largest size mattress being assembled. The substantially planar surface may be formed of a single piece construction or may be formed of plates. In some embodiments, the individual plates may be independently actuatable so as to exert differing pressures as may be desired in some applications.

As noted above, the automated system 10 can be fully automated via a programmable logic control and/or manufacturing execution solution system (i.e., the PLC/MES system) using a radio frequency identification tag (RFID) for component identification. By way of example, RFID tags may be affixed to the innercore unit and bucket assembly and/or foam layers and/or storage areas corresponding to the particular component for wireless recognition by the PLC/MES system. In this manner, orders can be managed and scheduled from the PLC/MES system. Still further, each of the various steps for placing and securing the foam layers onto the innercore unit and bucket assembly can be fully automated via the programmable logic control/manufacturing execution solution system, thereby requiring no operator interaction. Use of RFID tags for component identification enhances changeovers and allows for simple correction for variation between different innercore and bucket assembly types as well as different foam layer types.

Figure 33:
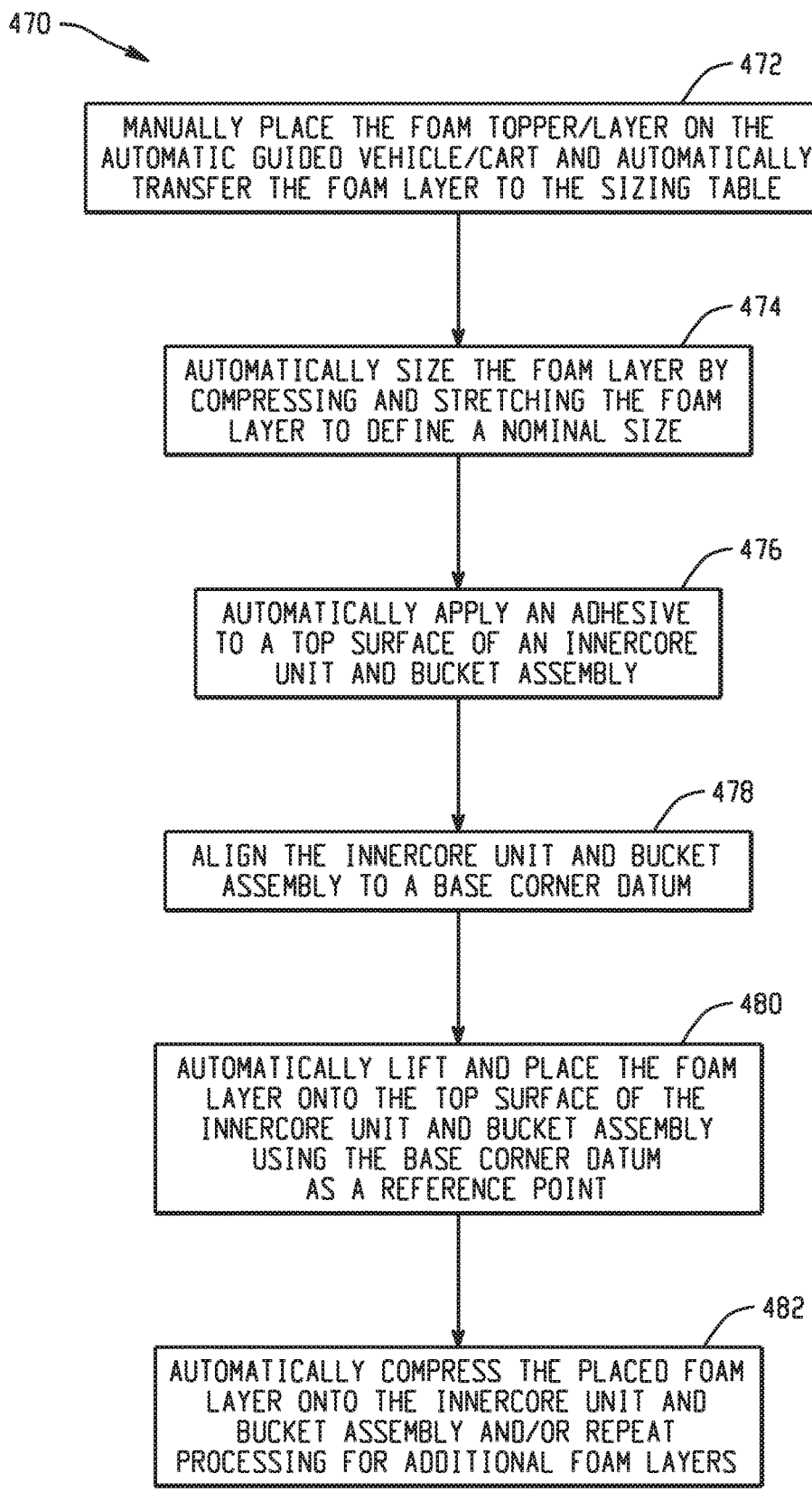
FIG. 33 illustrates an exemplary process flow for assembling a foam topper layer(s) onto an innercore unit and bucket assembly in accordance with the present disclosure.
Figure 34:
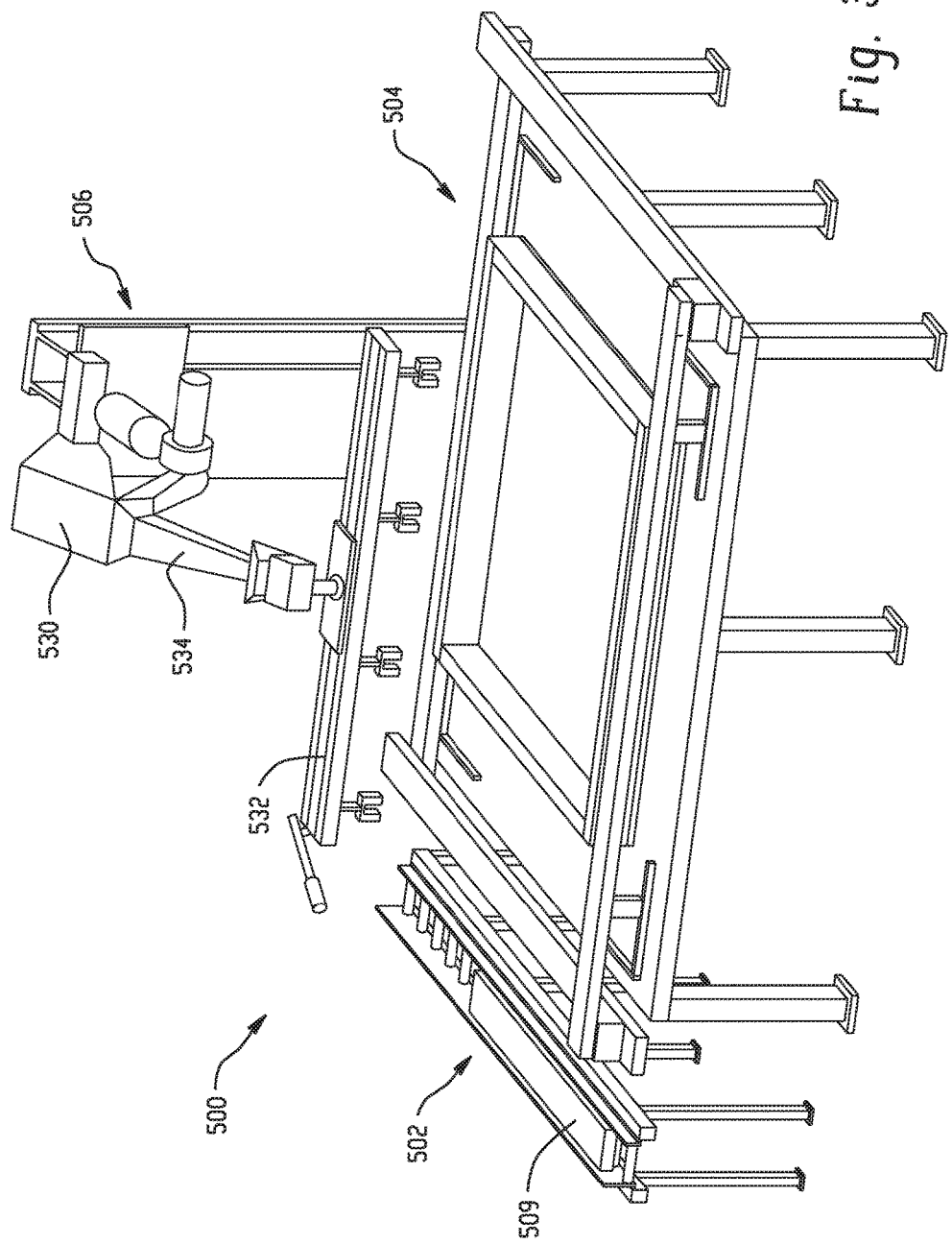
FIGS. 34-37 illustrate an automated foam encasement bucket assembly apparatus.

Turning now to FIG. 33, the process 470 of operating the foam encasement assembly station 300 generally includes a first step 472 of delivering a foam layer to the robotic foam layer sizing and robotic transfer station 306. This step is automatically performed. For example, an operator can manually place the foam from inventory on the automated guide vehicle, which can be programmed to automatically locate and transfer a desired foam layer to the sizing and transfer station. The foam layer is then sized in the sizing station, which first compresses and then stretches the foam layer to a nominal size as shown in step 404.

Prior to or simultaneously with the location and sizing of the foam layer, an innercore and bucket assembly is provided to the adhesive application station 302 as shown in step 406. In one embodiment, the innercore unit and bucket assembly can be directly fed from an innercore unit and bucket assembly station. An exemplary innercore unit and bucket assembly station is disclosed in U.S. patent application Ser. No. 14/481,419 entitled: Mattress Manufacturing Process and Apparatus to Michael DiMarco and filed on Sep. 9, 2014, incorporated herein by reference in its entirety. For example, the innercore unit and bucket assembly can be transferred to the conveyor of the adhesive application station where a predetermined pattern and volume of adhesive is then applied to the top surface. The innercore unit and bucket assembly with the applied adhesive is then transferred to the alignment station for alignment. All four sides are aligned as shown in step 408, wherein the coordinates are provided to the programmable logic control system.

The foam layer at the nominal size is then picked up from the foam layer sizing and robotic transfer station 306 and placed on the top surface of the aligned inner core unit and bucket assembly as shown in step 410. In this manner, the foam layer is precisely placed on the top surface of the innercore unit and bucket assembly (or previously deposited foam layer) and onto a controlled amount and defined pattern of adhesive. The process is then repeated until all foam layers for the mattress design build are placed as provided in step 412.

Subsequent to foam placement on the innercore and bucket assembly (or previously deposited foam layer), the assembly is transferred to the compression station, wherein downward pressure is applied onto the assembly to insure maximum and consistent adhesion of the foam layer to the innercore unit and bucket assembly. In situations where multiple foam layers are placed, the programmable logic control system may be programmed to provide the step of compression after each foam layer is adhesively placed, after selected foam layers are placed, or after all of the layers are placed. The system provides latitude as to when this may occur.

Referring back to FIG. 1, an exemplary process 10 flow for the automated manufacturing of a mattress in accordance with an embodiment is shown. In exemplary embodiments, the automated manufacturing process 10 includes, but is not limited to, coil unit assembly 12, innercore assembly 14, bucket assembly 16, foam encasement assembly 18, quilt assembly 20, packaging assembly 22, and shipping 24. As discussed above, many of the steps of the automated manufacturing process 10 are performed by specialty machines and the time required to perform each of the steps of the process may not be equal.

Once the foam encasement assembly is completed, the automated manufacturing process 10 proceeds to the quilt assembly 20, which includes first forming a border around the foam encasement. In exemplary embodiments, the border includes one or more layers of fabric with decorative stitching and a handle assembly. The boarder may also include the half cap bottom panel and a half cap topper for mattress with a pillow top. In exemplary embodiments, the types and configuration of the materials used in forming the boarder can vary from one mattress to the next. In exemplary embodiments, forming and affixing the border to the foam encased mattress takes about 1 minute.

Once the border assembly is completed, the automated manufacturing process 10 proceeds to the quilt assembly. The quilt assembly 110 is configured to receive a plurality of fabrics and foam materials and to create a quilted topper that is placed on the top of the mattress. In exemplary embodiments, the quilted topper includes a plurality of fabrics and foam materials are that are arranged in layers and are quilted together. The configuration and types of fabrics and foam materials that are used to form each quilted topper can vary from one mattress to the next in the manufacturing process.

In exemplary embodiments, the quilt assembly is capable of forming a quilted topper in about 1 minute. However, the throughput of the quilt assembly will be affected by any changeover needed when switching between forming various quilted topper configurations which require different raw materials. For example, in one embodiment, the quilt assembly may include a quilting machine that is configured to receive four layers of raw materials including fabrics and foam layers. If the combination of these materials changes from one mattress to the next, the operation of the quilting machine will be interrupted as the inputs to the machine are switched over to the materials needed for the next mattress. Accordingly, in exemplary embodiments the order in which the quilted toppers for mattresses are made by the quilt assembly will affect the throughput of the quilt assembly.

In addition, during the changeover process for the quilt assembly an amount of the raw materials that are being taken offline is wasted. In one embodiment, the raw materials are stored on large rolls that are fed into the quilting machine and during changeover the raw materials that have been unwound from the rolls of material but which have not yet used by the quilting machine are discarded as waste material when cropped to align the appropriate layers. Accordingly, in exemplary embodiments the order in which the quilted toppers for mattresses are made by the quilt assembly 110 will affect the amount of raw materials wasted by the quilt assembly.

Once the quilt assembly is completed, the automated manufacturing process 10 proceeds to closing, wherein the quilted topper is attached to the mattress. In exemplary embodiments, attaching a quilted topper to a mattress takes about 12 minutes. Next, the fully assembled mattress proceeds to the packaging assembly 22 where any labels are affixed to the mattress and where the mattress is placed into plastic wrapping. In exemplary embodiments, the packaging assembly 22 is capable packaging an assembled mattress in about 1 minute. After the mattresses have been packaged, the mattress proceeds to shipping 24 where the mattress is places onto the appropriate delivery truck. In exemplary embodiments, the shipping area may include multiple bays that each includes a truck destined for different locations. The optimization of the production orders is factored for the timing of each customer delivery.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An automated system for fabricating a mattress, the system comprising:
   a plurality of stations comprising:
      an automated coil unit assembly station comprising a coiler in operative communication with a coil staging apparatus to form a continuous string of pocketed coils;
      an automated innercore assembly station in operative communication with the coil staging apparatus configured to receive and cut the continuous string of pocketed coils to form string segments of the pocketed coils, and assemble and adhesively attach rows of the string segments to define a pocketed spring innercore;
      an automated bucket assembly station in operative communication with the automated innercore assembly to receive the pocketed spring innercore, wherein the automated bucket assembly station is configured to form a foam bucket defined by a foam base layer and foam side rails about a perimeter thereof to form a cavity, wherein the pocketed spring innercore is inserted into the foam bucket to form an innercore unit and bucket assembly; and
      an automated foam pick and place assembly station for placing and securing one or more foam layers onto the innercore unit and bucket assembly, wherein the foam pick and place assembly station comprises a foam pick and station comprising a sizing table configured to compress and stretch the one or more foam layers to a nominal size, wherein the sizing table comprises a planar surface for supporting the foam layer; an adjustable rail assembly in movable communication with the sizing table configured to compress and stretch the foam layer to a nominal size, the adjustable rail assembly comprising a pair of longitudinal rails and a pair of transverse rails to frame a periphery of the foam layer, each rail having a contact surface perpendicular to the planar surface to provide compression of the foam layer when in use; and one or more adjustable clamps disposed on each rail having a fixed portion carried by the rail and configured to slide underneath the foam layer upon compression and an adjustable portion configured to clamp down on the foam to permit stretching of the compressed foam layer to a nominal size when in use; a lifting assembly comprising a plurality of lifting units spaced about an adjustable frame assembly so as to provide lifting and release of the foam layer from the sizing table when in use, and a robotic arm coupled to the adjustable frame assembly and configured to move the adjustable frame assembly from the sizing table to the automated bucket assembly station;

a common conveyor for serially conveying an output from the automated coil unit assembly station to the automated innercore assembly station to the automated bucket assembly station and to the automated foam pick layer pick and place assembly station to form the innercore and bucket assembly including one or more foam layers disposed thereon; and a manufacturing execution system and programmable logic control for planning, scheduling, and controlling the plurality of stations.

2. The automated system for fabricating a mattress of claim 1, wherein the automated foam pick layer pick and place assembly station further comprises:

an adhesive application station for receiving and applying an adhesive to the innercore unit and bucket assembly, the adhesive application station comprising a movable surface to support the innercore unit and bucket assembly and a bridge spaced from and spanning the movable surface, the bridge comprising one or more adhesive applicators oriented to discharge a controlled amount of adhesive in a defined pattern onto the a surface of the innercore unit and bucket assembly;

an innercore unit and bucket assembly alignment station comprising a movable surface and an adjustable frame assembly configured to align the innercore unit and bucket assembly to a known datum point on the movable surface; and a compression station comprising a vertically adjustable platen spaced above a movable surface, wherein the movable surfaces of the adhesive applicator station, the innercore unit and bucket assembly alignment station, and the compression station form a portion of the common conveyor.

3. The automated system for fabricating a mattress of claim 2, wherein each one of the plurality of lifting units comprises a housing supporting two slides, each slide provided with one or more retractable angled needles, wherein the one or more retractable angled needles on one slide face toward the one or more retractable angled needles of the other slide; and the robotic arm is coupled to the adjustable frame assembly and configured to move the adjustable frame assembly from one location to another.

4. The automated system for fabricating a mattress of claim 3, wherein the one or more retractable angled needles in one slide is at an angle in a range of about 30 degrees to about 60 degrees relative to the plane of the foam layer and the angle of the one or more retractable needles in the other slide is in a range of about 120 to about 150 degrees relative to the plane of the foam layer such that the one or more retractable needles in the one slide and the other slide converge upon extension from the respective sliding.

5. The automated system for fabricating a mattress of claim 2, wherein the plurality of lifting units spaced about the adjustable frame assembly are configured to selectively engage and disengage an underlying foam layer so as to provide lifting and release of the foam layer when in use.

6. The automated system for fabricating a mattress of claim 1, further comprising an automated quilting assembly station downstream from the automated foam pick layer pick and place assembly station.

7. The automated system for fabricating a mattress of claim 6, further comprising a packaging assembly station and a shipping assembly station downstream from the automated quilting assembly station.

8. The automated system for fabricating a mattress of claim 1, wherein the coil string staging apparatus comprises an input configured to receive a continuous coil string; a staging buffer configured to store at least a portion of the continuous coil string such that the staging buffer has a buffer capacity; and an output coupled to the staging buffer such that the continuous coil string stored in the staging buffer is configured to selectively discharge the continuous coil string.

9. The automated system for fabricating a mattress of claim 1, wherein the automated bucket assembly station further comprises a foam rail conveyor configured to carry each one of the foam side rails that form the cavity of the foam bucket to the automated bucket assembly station.

* * * * *